(12) United States Patent
Steele et al.

(10) Patent No.: US 9,574,444 B2
(45) Date of Patent: Feb. 21, 2017

(54) SYSTEMS AND METHODS FOR MOTION CAPTURE IN AN UNDERGROUND ENVIRONMENT

(75) Inventors: Roderick Mark Steele, Azilda (CA); Duncan Paul Steele, Azilda (CA); Christopher Keith Steele, Tunbridge Wells (GB)

(73) Assignee: TESMAN INC., Sudbury (CA)

( * ) Notice: Subject to any disclaimer, the term of this patent is extended or adjusted under 35 U.S.C. 154(b) by 502 days.

(21) Appl. No.: 14/347,664

(22) PCT Filed: Sep. 30, 2011

(86) PCT No.: PCT/CA2011/001105
§ 371 (c)(1),
(2), (4) Date: Jul. 7, 2014

(87) PCT Pub. No.: WO2013/044345
PCT Pub. Date: Apr. 4, 2013

(65) Prior Publication Data
US 2014/0313502 A1    Oct. 23, 2014

(51) Int. Cl.
*G01C 3/08* (2006.01)
*E21C 35/00* (2006.01)
*G01S 17/48* (2006.01)
*G01S 5/16* (2006.01)
*E21B 7/02* (2006.01)

(52) U.S. Cl.
CPC ............... *E21C 35/00* (2013.01); *E21B 7/022* (2013.01); *G01S 5/163* (2013.01); *G01S 17/48* (2013.01)

(58) Field of Classification Search
CPC ...... G01S 17/48; G01S 17/0057; G01S 5/163; E21B 7/022; G01B 11/2509
USPC ................................................. 356/4.01, 601
See application file for complete search history.

(56) References Cited

U.S. PATENT DOCUMENTS

| | | | | |
|---|---|---|---|---|
| 5,227,985 | A * | 7/1993 | DeMenthon | G01S 5/163 345/158 |
| 6,205,243 | B1 * | 3/2001 | Migdal | G01B 11/2518 250/559.23 |
| 6,664,531 | B2 | 12/2003 | Gartner et al. | |
| 7,124,066 | B2 | 10/2006 | Marschner et al. | |
| 7,929,751 | B2 | 4/2011 | Zhang et al. | |
| 8,009,192 | B2 | 8/2011 | Raskar et al. | |
| 2002/0057438 | A1 | 5/2002 | Decker | |
| 2005/0105772 | A1 * | 5/2005 | Voronka | G06T 7/2033 382/103 |
| 2016/0196667 | A1 * | 7/2016 | Densham | H04N 5/247 348/169 |

FOREIGN PATENT DOCUMENTS

| WO | 2006099589 A2 | 9/2006 |
|---|---|---|
| WO | 2013044345 A1 | 4/2013 |

OTHER PUBLICATIONS

PCT International Search Report for application No. PCT/CA2011/001105 dated Jun. 28, 2012.

(Continued)

*Primary Examiner* — Mark Hellner
(74) *Attorney, Agent, or Firm* — Norton Rose Fulbright Canada LLP

(57) ABSTRACT

Systems and methods for motion capture of a subject, suitable for use in an underground mining environment.

27 Claims, 22 Drawing Sheets

(56) References Cited

OTHER PUBLICATIONS

PCT Written Opinion for application No. PCT/CA2011/001105 dated Jun. 28, 2012.
PCT Preliminary Report on Patentability for application No. PCT/CA2011/001105 dated Apr. 1, 2014.

* cited by examiner

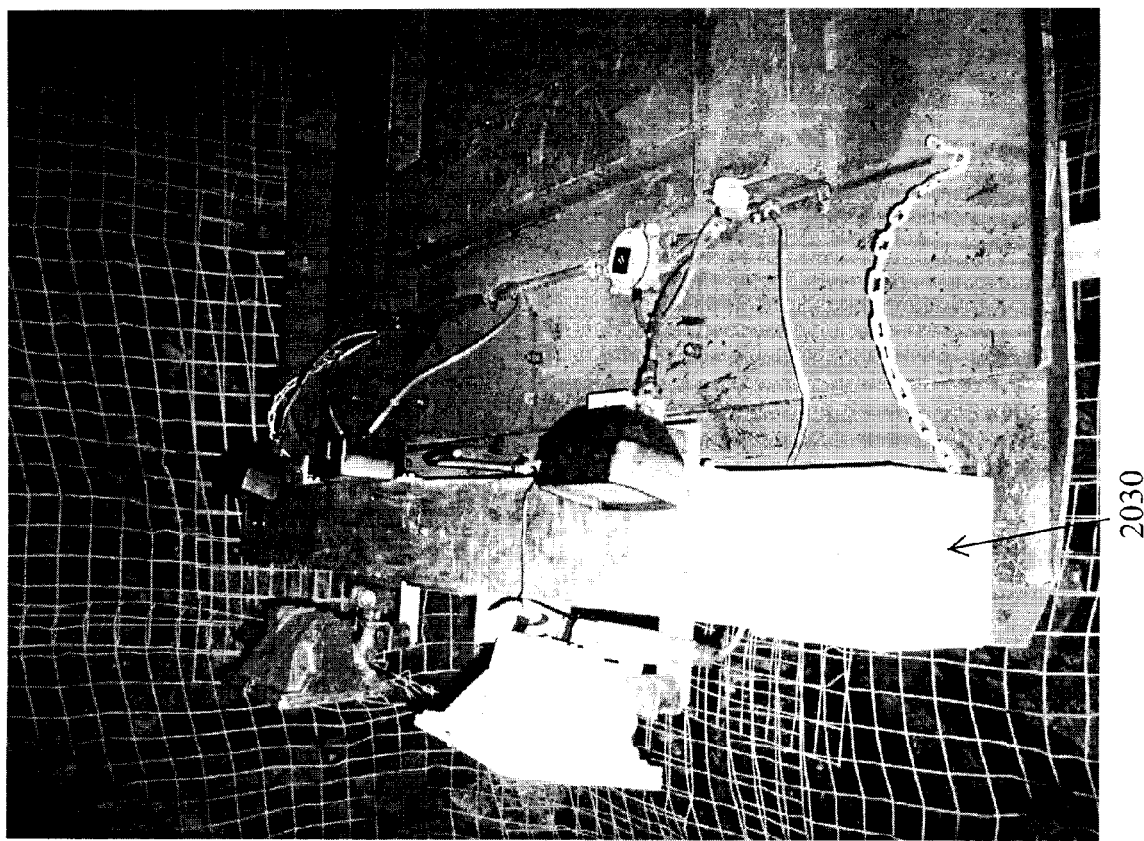

SYSTEMS AND METHODS FOR MOTION CAPTURE IN AN UNDERGROUND ENVIRONMENT

TECHNICAL FIELD

The present disclosure relates generally to systems and methods for motion capture in an underground environment, such as in a production mine, while carrying out a production process or any other process in a generally harsh environment, such as an underground environment.

BACKGROUND

Positioning of drills and other machinery in an underground environment, such as in mining, is often challenging. Precision and accuracy are often required when positioning and carrying out drilling processes, in order to reduce costs and danger, to operators, crew and machinery.

One method of mining is known as drift mining, in which longitudinal tunnels are drilled into hard rock underground. The tunnel may be created by tunnel boring machines, which grind away at the face of the tunnel until the desired tunnel is formed. Alternatively, the tunnel may be created by blasting. This involves drilling blastholes into the face to a known depth, filling the blastholes with explosives and creating the tunnel by detonating the explosives. In the blasting method, the positioning of the end locations, or "toes" of the blastholes affects how cleanly the tunnel is excavated. Even positioning of the toes helps to ensure that the tunnel is excavated with little or no remaining debris or "bootleg". The presence of bootleg in a newly excavated tunnel may be dangerous and may be time-consuming and/or costly to remove, typically costing about $3000-$4000 per foot. However, positioning of the toes is often challenging since the blastholes typically are drilled 10-15 ft deep into the face and only 2-3 inches in diameter, with the result that a skew of as little as 1 degree during drilling can result in significant error in positioning of a toe.

In the blasting method, typically a drill machine referred to as a jumbo is used. The jumbo drill includes booms with drills mounted at the end. These booms are maneuvered to position and orient the drills for creating the blastholes in the rock. The positioning and orientation of the booms may directly affect the accuracy of the positioning of the toes. Most conventional jumbo drills typically rely on the judgment of the operator to place the drills and drill the blastholes accurately based on visual observation of the booms from the cab of the drill machine. The operator typically marks the drill face with paint and uses his subjective judgment to attempt to get the booms positioned and oriented to correctly place the resulting toes. There are typically no optical, video or visual guidance or feedback provided to the operator to assist in this process. The result is typically inconsistent toe placement, and an average of 5% bootleg is typically present in the excavated tunnel.

A small number of conventional jumbo drills may use a series of cables to measure distance traveled by the boom, and may also use gyros and accelerometers mounted on the drill slide to generate the same data for the operator. Such machines may also automate the process of drilling to reduce the reliance on the operator and to improve the accuracy of the process. However, such machines are often cost-prohibitive and unreliable. For example, such machines may be vulnerable to the hazards of the environment, such as moisture, temperature and vibration. Such machines often require extensive maintenance, are often complex and expensive to maintain, and often require long down-times for maintenance.

It would be useful to provide a solution for measuring and capturing the motion of machinery and other processes in an underground environment, to provide feedback to an operator. It would be useful to provide a solution that may be retrofitted to conventional jumbo drills or other machinery or apparatus. I would also be useful to provide a system that would require little maintenance.

SUMMARY

In some aspects, the present disclosure provides a system for motion capture of a subject including: at least two light targets mountable in a predetermined geometry on the subject, the light targets having a set of predetermined characteristics; at least two cameras each positionable at a reference location for capturing images of the light targets over multiple time points; and a processor in communication with the cameras, the processor executing instructions to cause the processor to: receive at least one set of image data from each camera; determine any spots corresponding to the light targets in the sets of image data received from each camera by blurring the image data to remove background noise and applying a set of criteria based on the predetermined characteristics of the light targets; calculate three-dimensional (3D) locations of the light targets using the determined spots; fit the calculated 3D locations to the predetermined geometry of the light targets to calculate at least one of a position value and a motion value for the subject; and provide the at least one of the position value and the motion value to be displayed as real-time feedback.

The system may include a display for displaying the feedback.

The subject to be tracked may be a piece of equipment to be operated in a surface or underground environment, for example a surface or underground mining environment. The subject may be a mobile or stationary piece of machinery, such as a drill machine to be operated in an underground mining environment.

Where the subject is a drill machine, the light targets may be mounted on at least one boom of the drill machine.

The light targets may be low power light sources or light reflectors.

The light targets may be mountable on the subject using one or more mounting fixtures, and may be mountable in the predetermined geometry on each mounting fixture.

The predetermined characteristics of the light targets may include one or more of: predetermined light intensity, predetermined light color, predetermined size and predetermined shape.

The cameras may be low power, low resolution cameras.

There may be three cameras that are fixed relative to each other.

In some aspects, the present disclosure provides a method for motion capture of a subject, the method including: receiving, at a processor, at least one set of image data from at least two cameras, the cameras being positioned at reference locations to capture image data of at least two light targets; determining any spots corresponding to the light targets in the sets of image data received from each camera by blurring the image data to remove background noise and applying a set of criteria based on predetermined characteristics of the light targets; matching the determined spots among two or more sets of image data from different cameras to obtain matched points; calculating three-dimensional (3D) locations of the light targets using the matched points; fitting the calculated 3D locations to a predetermined geometry of the light targets to calculate at least one of a position value and a motion value for the subject; and providing the at least one of the position value and the motion value to be displayed as feedback.

Determining the spots corresponding to the light targets may include: determining one or more candidate spots by applying a feature detection algorithm to the image data; storing the one or more candidate spots in a list of candidate spots; and storing the list of candidate spots as a list of spots corresponding to the light targets.

The feature detection algorithm may be a difference of Gaussians algorithm.

Determining the spots corresponding to the light targets may further include at least one of: a) determining a light intensity value for the one or more candidate spots and discarding from the list of candidate spots any candidate spots having light intensity values that do not satisfy a predefined light intensity criterion, the light intensity criterion being based on the predetermined characteristics of the light targets; b) determining a roundness value for the one or more candidate spots and discarding from the list of candidate spots any candidate spots having roundness values that do not satisfy a predefined roundness criterion, the roundness criterion being based on the predetermined characteristics of the light targets; and c) determining a color value for the one or more candidate spots and discarding from the list of candidate spots any candidate spots having color values that do not satisfy a predefined color criterion, the color criterion being based on the predetermined characteristics of the light targets.

The method may further include: as each new candidate spot is identified, calculating the distance between the new candidate spot and any previously identified candidate spots and discarding the new candidate spot if the distance is below a predefined nearness threshold value.

Blurring the image data may include convolving the image data with a Gaussian kernel. determining any spots corresponding to the light targets in the sets of image data received from each camera by blurring the image data to remove background noise and applying a set of criteria based on predetermined characteristics of the light targets Camera pairs may be defined among the cameras, each camera taking part in at least one camera pair and the camera pairs being definable to have an overlap in cameras, and matching the determined spots may include: attempting to match the determined spots between the sets of image data from the cameras of a first camera pair; and for any determined spots that remain unmatched, attempting to match the remaining unmatched determined spots between the sets of image data from the cameras of a second camera pair.

The predetermined geometry may include a predetermined number of light targets, and fitting the calculated 3D locations to the predetermined geometry may include: determining possible combinations of the 3D locations corresponding to the predetermined number of light targets; for each possible combination, determining a similarity to the predetermined geometry; and determining a most similar combination as a fit to the predetermined geometry.

Determining the similarity to the predetermined geometry may include calculating a variance of the possible combination from the predetermined geometry.

The position value may be at least one of: a Cartesian position and an orientation. The motion value may be at least one of: a velocity, an angular velocity and an acceleration.

In some aspects, the present disclosure provides a computer program product for motion capture of a subject, the computer program product including computer-executable code that, upon execution, causes a processor to carry out the methods described above.

In some aspects, the present disclosure provides a use of the systems described above for motion capture of a subject in an underground environment.

BRIEF DESCRIPTION OF THE DRAWINGS

Reference will now be made to the drawings, which show by way of example embodiments of the present disclosure, and in which:

FIG. 8 shows images of an example camera housing, in this case having three cameras in use, mounted on the drill machine of FIG. 1;

It will be noted that throughout the appended drawings, like features are identified by like reference numerals.

DETAILED DESCRIPTION

Figure 1:
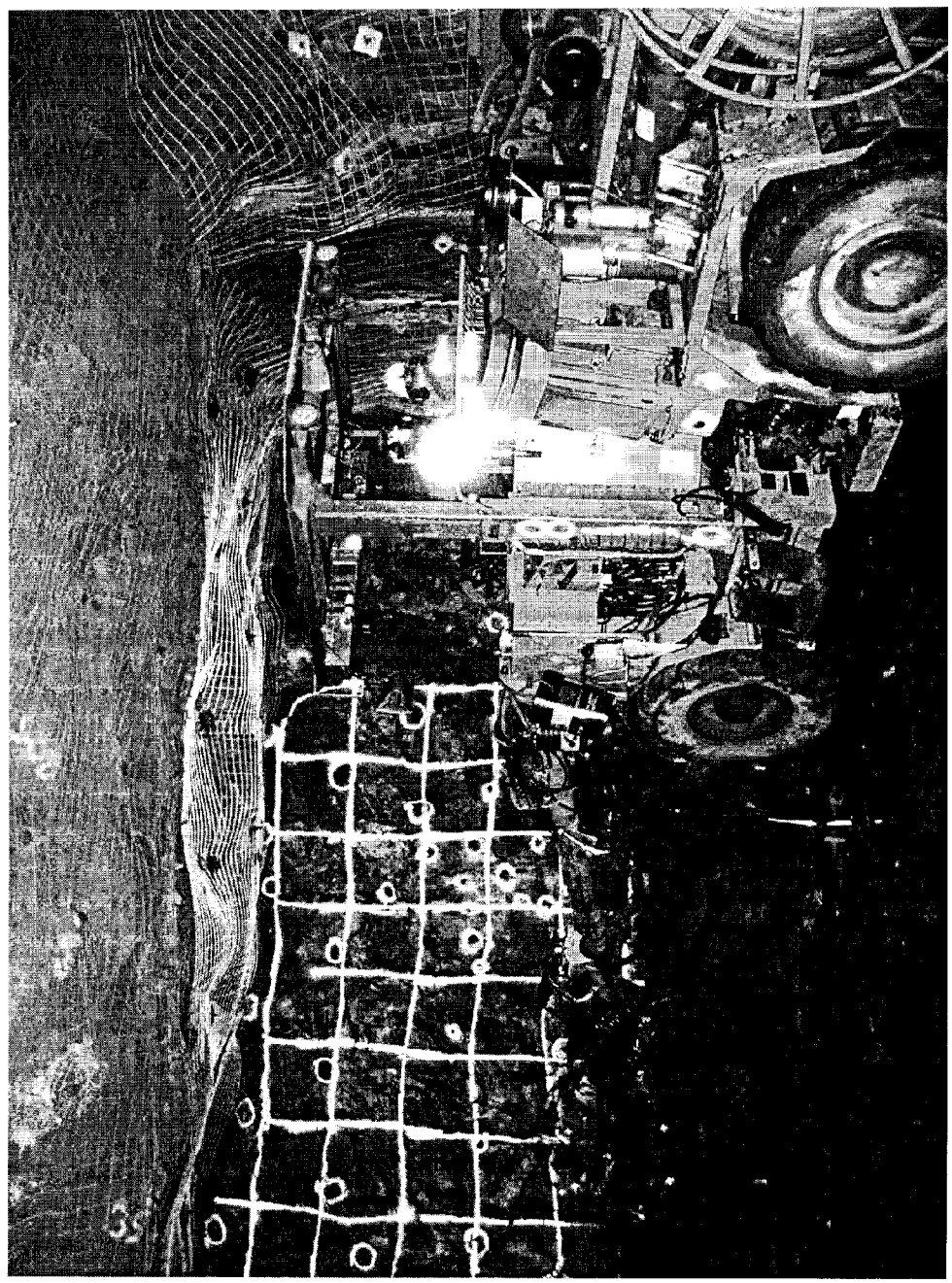
FIG. 1 shows an image of a drill machine, in this case a two boom jumbo drill, drilling on the face of a tunnel in an underground environment.

In some example embodiments, the present disclosure provides methods and systems for motion capture in an underground environment, or any other harsh environment, such as where there may be poor lighting, high vibrations, dust and mud, limited power, limited space and rough handling of equipment. In particular, the disclosed systems and methods may involve the extrapolation from video, still images or other electronic representations of data regarding the motion of one or more subjects in the images. If images of a subject are used from two or more known vantage points at the same time point, this data may be extrapolated into three-dimensional (3D) data (e.g., x, y and z co-ordinates against time frames). The subject may be identified using visual targets, or other identifiable targets (e.g., light targets, as described below) on the subject and/or by tracking the outline of a feature of the subject or the outline of the entire subject.

The present disclosure is related to industrial motion capture, in particular. Compared to motion capture for the gaming or movie industry, or for laboratory usage, industrial motion capture may be applied in a general industrial environment without adapting or interrupting the normal visual, lighting and operating conditions of the industrial environment to suit the motion capture process. This often means accommodating one or more of the following conditions depending on the industrial environment and/or application: extreme vibrations, poor or extreme lighting, moisture, dust, mud, heat, cold, noise, poor maintenance, poor visibility, physical abuse, and single random viewpoint rather than multiple chosen viewpoints or vantage points of the subject. These factors generally simply do not exist in other motion capture environments.

Although motion capture may be used in some limited, relatively controlled outdoor applications, such as in sporting, surveillance and security applications, these applications often use edge detection to capture motion of an object, rather than associated light or reflective targets, and typically require the environment to be adapted to accommodate the motion capture technique. For example, motion capture may be from a fixed viewpoint and under mild conditions. In contrast, in the mining environment, the conditions are relatively harsh as described above, and it may be desirable to provide motion capture using a mobile or moving viewpoint.

The disclosed motion capture in the industrial context may be adapted to the industrial environment rather than the other way around. This may include tracking the subject using targets and/or the outline of the subject. In some examples, the methods and systems described herein may be useful for industrial motion capture in the mining industry. That is, the industrial motion capture capability may be used specifically in surface and/or underground mining environments, in addition to a more controlled environment, such as an industrial workshop. In some cases, the surface mining applications described herein may work continuously (i.e., 24 hours a day, everyday), around the world, in all climates, under day and night lighting conditions.

The underground mining environment typically operates continuously, and may include a variety of harsh conditions, such as extreme noise and vibration (e.g., from pneumatic and hydraulic action), saturation by ground water and pressure washers during maintenance cycles, heat and cold, extreme humidity and condensation on and in the equipment, poor or no reference points, poor or extreme ventilation, harsh operator generated physical abuse, continuous use as well as extended periods of dormancy in poor conditions, limited to restricted visibility (e.g., due to free-flying debris such as mud and dirt), poor lighting conditions, single or multiple light sources, generating multiple reflections to distract any automated visual system, poor quality power supply options, and extended periods between access to service.

Such conditions are typically not found in laboratory environments or in the movie and entertainment, sport, surveillance or other such industries. The harshness of the underground environment may make it difficult to employ conventional motion capture systems and methods.

The present disclosure describes industrial motion capture in a harsh environment, including an underground environment, in particular a mining environment, where the light targets and cameras are mounted on a drill, such as a tunnel drilling jumbo drill. The described systems and methods may also be employed in more conventional settings.

As noted, the disclosed systems and methods may be used for motion capture of a wide variety of apparatuses and in a wide variety of environments. An example, not meant as a limitation as such, is in the context of motion capture of a jumbo drill in a mining environment. Typically, the jumbo drill machine may include one or more drill arms as well as a number of service arms to hold other tools and/or baskets for carrying workers interacting with the tools.

In such an environment, the present disclosure may allow expensive components of the drilling system to be relatively protected (e.g., from falling debris) and typically expendable or durable components to be exposed to relative hazard. Expendable components may be, for example, mounting fixtures and light targets, whereas expensive or delicate components may be, for example, cameras, display screens and computers. By relatively protected, it is meant that the protected component, while still being present in the same harsh environment has less and/or controlled exposure to risk of damage. Thus, while it may be desirable to limit exposure of expensive or delicate components to extreme hazards such as falling rocks, it may be acceptable to expose such expensive or delicate components to less extreme conditions, such as dust, vibration and moisture. Nevertheless, any and all components may be protected or exposed.

Use of the disclosed systems and methods may provide feedback that may be used by an operator (e.g., operator of a drill machine) to clearly observe and/or control operation of the machinery. For example, application of the disclosed systems and methods for motion capture of a drill machine may allow an operator to observe the position and/or motion of the drill booms of the machine. This may allow the operator to orient and place the drill booms with greater accuracy, to drill a hole. As mentioned above, the placement of each toe may be highly dependent on the position and orientation of a drill boom drilling the hole (e.g., a skew of as little as 1 degree in the boom may result in significant errors, such as offsets of 1 feet or more, in placement of a toe), and a poorly-placed toe may result in a bootleg that may be costly (e.g., about $3000-$4000 per foot) and/or time-consuming to remove. Hence, any feedback provided to the operator to help improve boom placement accuracy may be beneficial.

Figure 2:
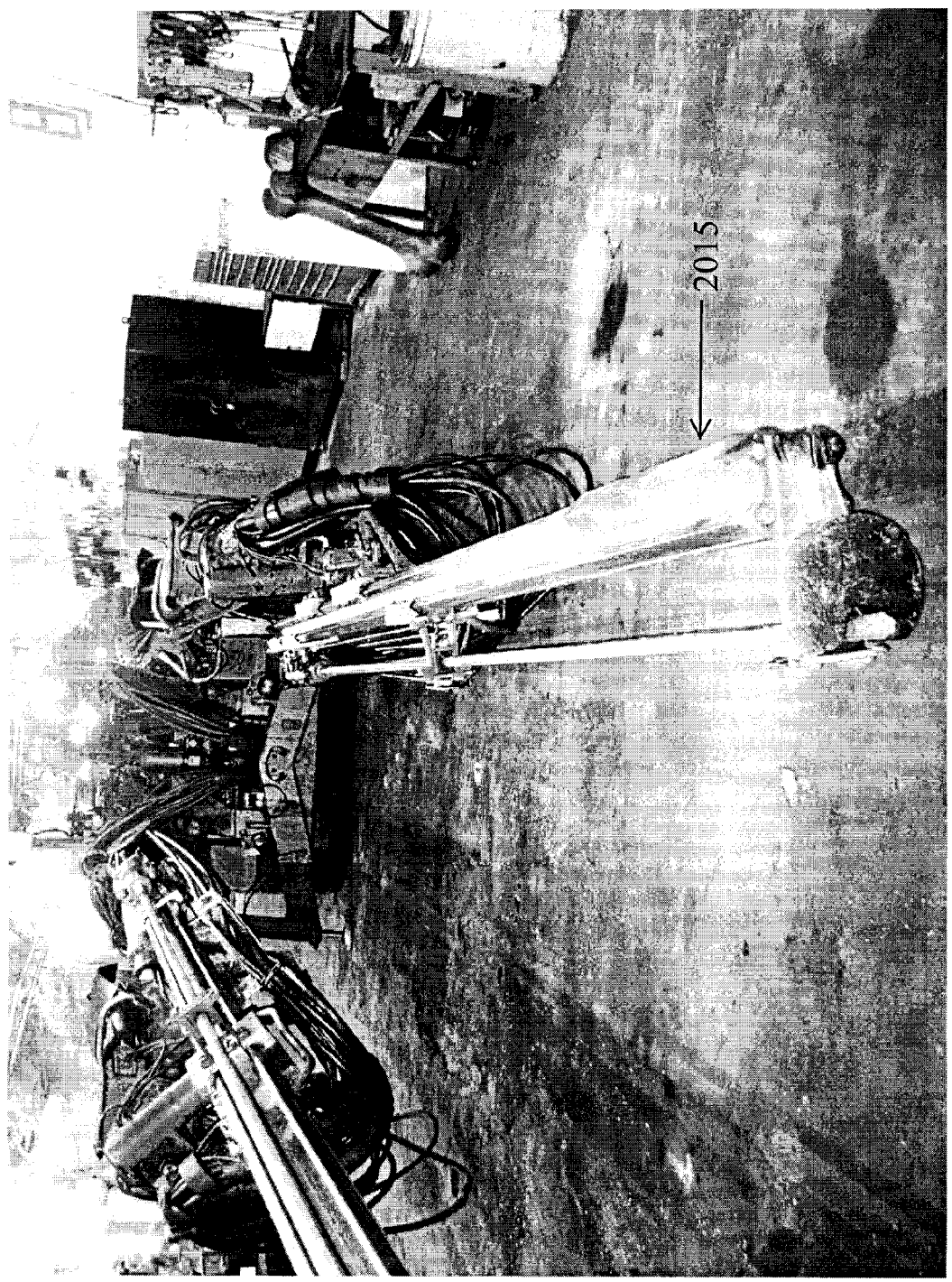
FIG. 2 shows images of the booms of the drill machine of FIG. 1.
Figure 3:
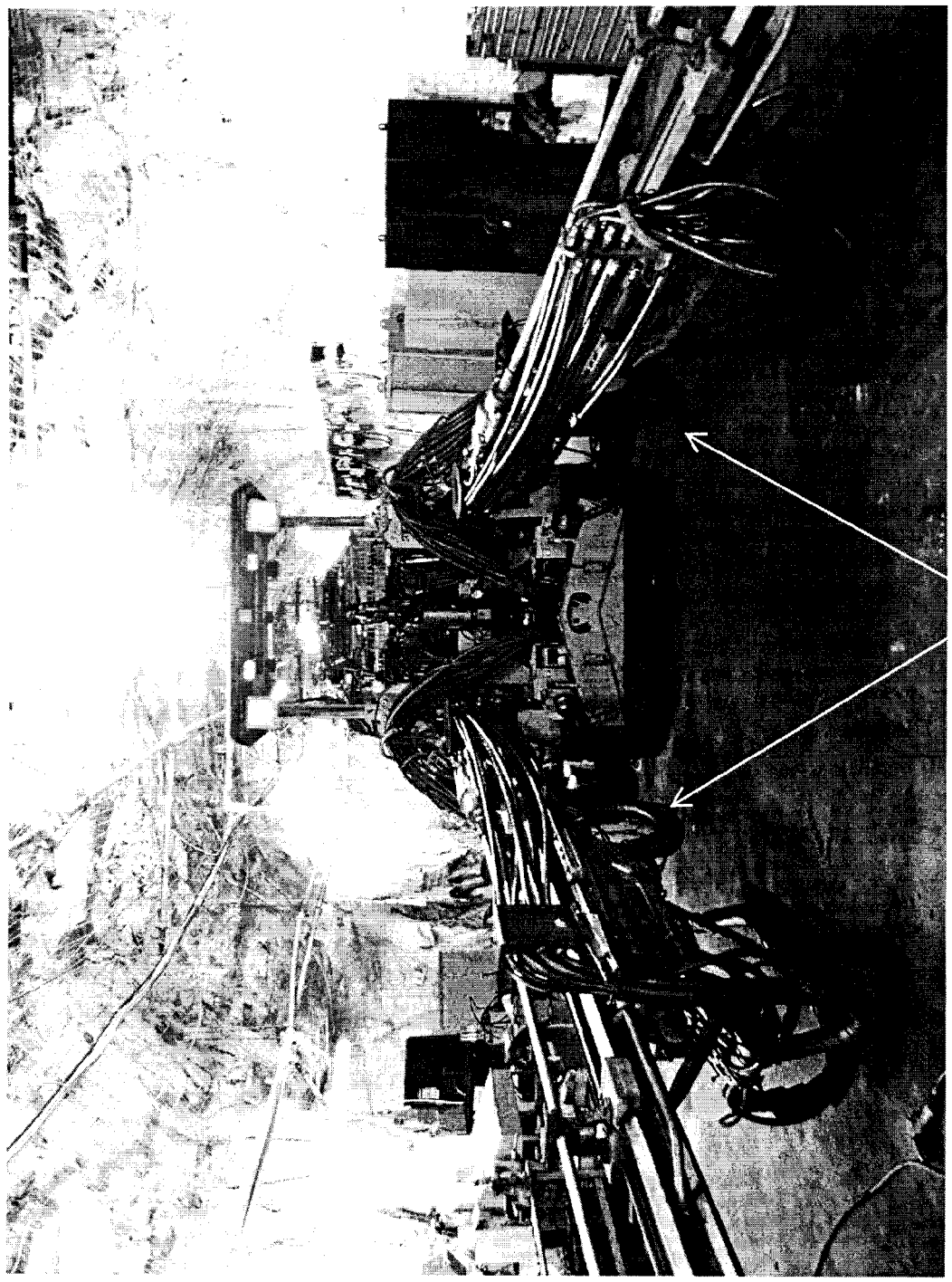
FIG. 3 shows an image of the front of the drill machine of FIG. 1.
Figure 4:
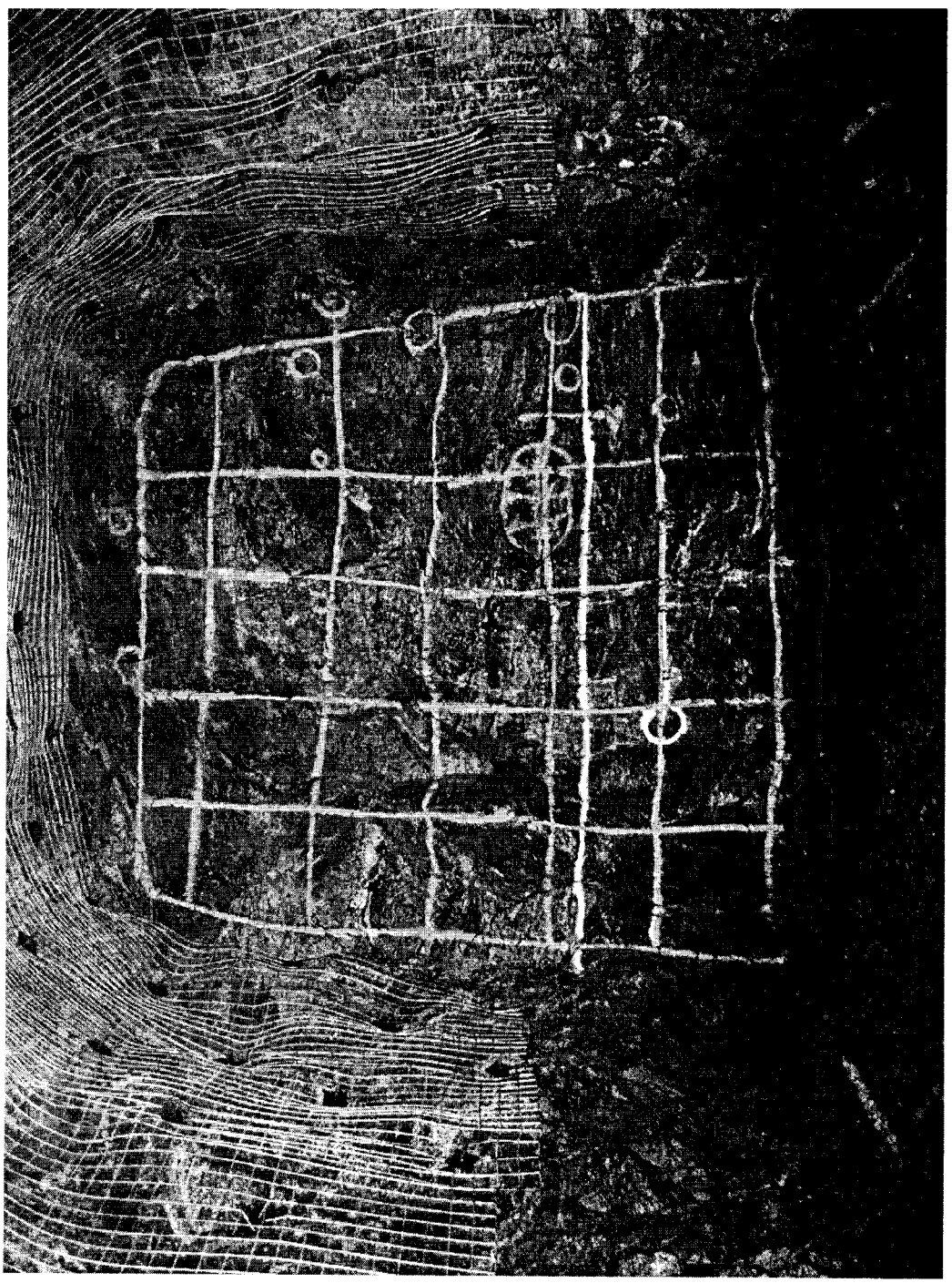
FIG. 4 shows an image of a face of a tunnel marked by an operator and ready for drilling.
Figure 18:
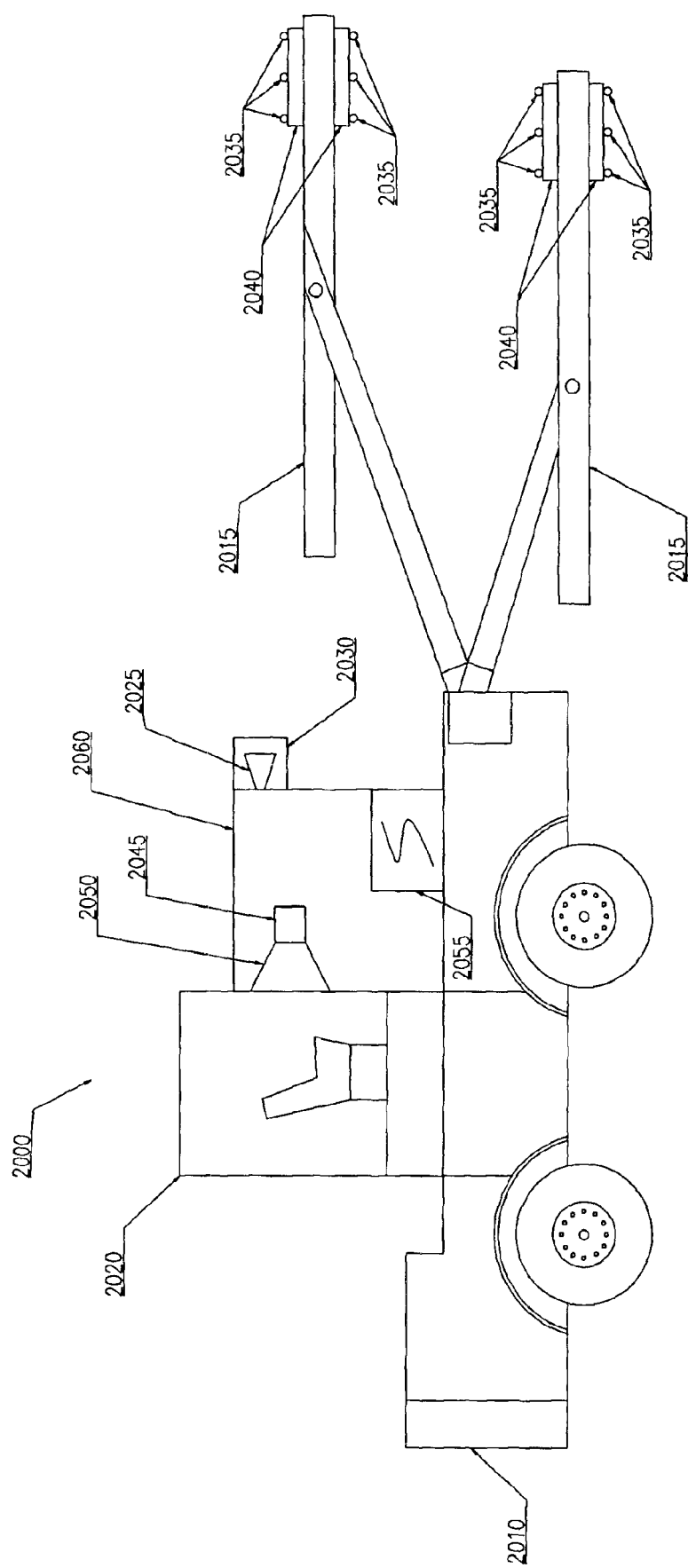
FIG. 18 is a schematic diagram of an example of the disclosed system.

FIG. 18 shows an example system 2000 for motion capture in an underground environment. FIGS. 1-4 are photographs showing an example two boom jumbo drill machine 2010 on which the system 2000 may be implemented, and the environment in which the system 2000 may be used. FIG. 1 shows the drill machine 2010, drilling on the face of a tunnel in an underground environment. FIG. 2 shows the booms 2015 and FIG. 3 shows the front of the drill machine 2010. FIG. 4 shows the face of a tunnel marked by an operator and ready for drilling by the drill machine 2010.

The system 2000 may be used with a drill machine 2010 that includes one or more drill boom(s) 2015 whose position(s) and movement(s) is to be tracked using the disclosed system 2000. Typically, a drill machine 2010 may include one to six independent booms 2015, although some machines 2010 may have more than six booms 2015. In this example, the drill machine 2010 includes two booms 2015, each of which may be individually tracked by the disclosed system 2000, independently and simultaneously. The drill machine 2010 may further include a cabin 2020 from which the operation of the drill machine 2010 may be controlled.

The example system 2000 may include a plurality of light targets 2035 to be mounted on the tracked subject (in this example, the booms 2015), two or more cameras 2025 (only one of which is shown in the side view of FIG. 18) for capturing images of the light targets 2035, a processor 2045 for receiving image data and tracking motion of the subject, and a display 2050 for providing feedback to an operator. The system 2000 may additionally include a camera housing 2030 for housing one or more cameras 2025, one or more light target mounting fixtures 2040 for mounting the light targets 2035 to the tracked subject, a processor housing 2060 for housing the processor 2045 and/or the display 2050, and a power source 2055. Although not shown, the system 2000 may also include cables for communicating power and/or data among the individual components as appropriate. In some examples, data may be communicated wirelessly among the appropriate components and cables may not be necessary for data communication. In some examples, each component may have its own power source 2055 and cables may not be necessary to provide power.

Further details of the example system are shown in FIGS. 10-17.

The two or more cameras 2025 will be described with reference to FIGS. 8, 10, 11, 12, 13, 17 and 18. FIG. 8 is a photograph showing an example of how cameras 2025 in a camera housing 2030 may be implemented on a two boom drill machine 2010. The cameras 2025 may be positioned at reference locations. The reference locations may be absolute reference locations (e.g., placed on a non-mobile surface) or relative reference locations (e.g., mounted on the mobile drill machine 2010). When in use, the cameras 2025 may be fixed relative to each other.

In the example system of 2000, the cameras 2025 may be housed in the camera housing 2030, in order to protect the cameras 2025 from extreme hazards (e.g., falling rock). In other examples, the cameras 2025 themselves may be relatively robust and resistant to damage, and the camera housing 2030 may not be necessary. In this example, the system 2000 includes three cameras 2025, all of which may be housed in a single camera housing 2030. In other examples, there may be more or fewer cameras 2025, and the cameras 2025 may be housed together or independently.

The cameras 2025 (e.g., in the camera housing 2030) may be positioned along the leading edge of the cabin 2020 of the drill machine 2010, just under the roof. In other configurations, for example depending on the cabin 2020 layout of different drill machines 2010 (e.g., some drill machines 2010 may not include a roof and/or may not include a cabin 2020), the cameras 2025 may be positioned at other locations on the drill machine 2010, for example above or in front of the cabin 2020 (e.g., if the cabin 2020 has no roof) or on other locations on the drill machine 2010, as suitable. Other suitable locations may also be employed. The cameras 2025 may communicate data to the processor 2045 through wired or wireless communications. In this example system 2000, cables (not shown) may allow the cameras 2025 to communicate with the processor 2045. There are three cameras 2025 in this example system 2000. At least two cameras 2025 are used to provide 3D motion capture, however the use of more than two cameras 2025 may be useful to provide redundancy avoid blind spots. Pairs may be defined among the cameras 2025. Each camera 2025 may be paired with each other camera 2025 at least once. For example, for three cameras A, B, C, the camera pairs may be A-B, A-C and B-C. For four cameras A, B, C, D, the camera pairs may be A-B, A-C, A-D, B-C, B-D and C-D.

Although the cameras 2025 are shown as being located at a single fixed location relative to the equipment (in this case, the drill machine 2010), it should be understood that the cameras 2025 may be arranged in various different locations on the equipment, in a single housing 2030 or in separate housings 2030. Additionally or alternatively, some or all of the cameras may be mounted at reference locations off the drill machine 2010, such as on another piece of equipment, or at a reference location in the environment (e.g., placed on a stand on the floor or mounted to a wall) In the present example, the cameras 2025 may be relatively low-power YUV (i.e., black and white) cameras, having a low pixel density and small size (e.g., about 1 cubic inch) however it should be understood that other types of cameras 2025 may be suitable. The cameras 2025 of the present example may have relatively low pixel resolution, as a trade-off for low power consumption. For example, the cameras 2025 may have a resolution of 640×480 pixels or lower, and have a power consumption of about 2 W/12 VDC or lower, for example as in the case of the Bonsai™ Fire-i™ Digital Camera from Unibrain™. Other suitable cameras may be used, and the power consumption and pixel resolution of the cameras 2025 may be different for different applications. For example, the resolution described above may be used for motion capture of a subject at a range of up to 30 feet. Higher resolutions, such as up to 1024×600 for motion capture of a subject at a farther range, such as up to 120 feet. Further, the pixel resolution of the cameras may increase as technology cost, size and power changes in the future.

For example, using high density cameras may be useful to help improve the accuracy of motion capture and may also allow for more accurate motion capture of farther subjects. The use of high density cameras may also allow for tracking of faster moving subjects and smaller subjects with greater accuracy and precision. Also, RGB or other types of cameras may be used to accommodate special lighting applications, for example, as opposed to YUV cameras.

The cameras 2025 in the example system 2000 may be in fixed positions relative to each other in the camera housing 2030, and with respective fixed lenses. Although not shown, the camera housing 2030 may also include one or more small lasers that project light spots on the ground in front of the drill machine 2010, that may be used as a visual reference for the operator to verify which direction the camera housing 2030 (and hence the cameras 2025) is pointing in. This may help the operator to properly rotate the camera housing 2030 (and hence the cameras 2025) towards the direction of drilling.

Figure 17:
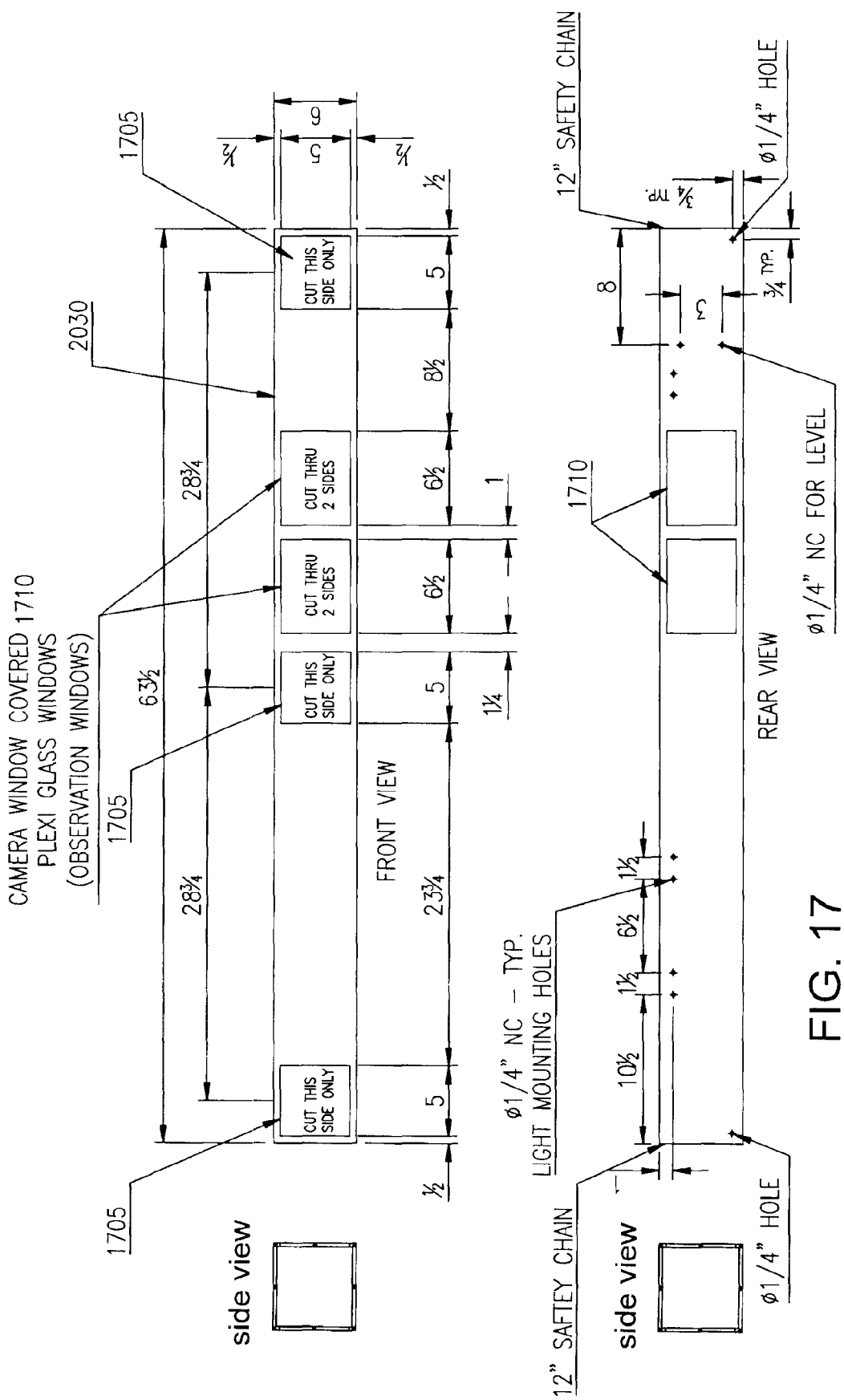
FIG. 17 shows diagrams of a camera housing in an example of the disclosed system.

FIG. 17 shows the layout of the camera housing 2030 in the example system 2000. In this example, the camera housing 2030 may be formed mostly of a sturdy material, such as aluminum. In this layout, there are three evenly spaced windows 1705 through which the cameras 2025 may capture images. The camera housing 2030 may further include one or more observations windows 1710 that provide a line-of-sight through the housing 2030, to allow the operator to see through the housing 2030 to improve his view from the cabin 2020. The windows 1705, 1710 may be covered in a transparent covering, such as plexiglass, to keep the inside of the camera housing 2030 separated from the outside environment. In this example, the camera housing 2030 is configured as a rectangular tube.

It should be understood that other configurations of the cameras 2025 and camera housing 2030 may be possible. For example, there may be two, three or more cameras 2025 and the camera housing 2030 may be modified accordingly. The camera housing 2030 may house one, two or more cameras 2025 and the system 200 may include more than one camera housing 2030. Although the cameras 2025 are shown to be positioned in a linear arrangement, it should be understood that the cameras 2025 may be positioned in other arrangements, for example the three cameras 2025 may form an angle relative to each other, may be positioned at different heights and/or may be oriented to point in different directions.

Although the example camera housing 2030 is described as being formed of a non-transparent material with cut-out transparent windows 1705, 1710, it should be understood that in other examples the entire camera housing 2030 may be transparent (e.g., entirely made of plexiglass) so that no defined windows 1705, 1710 may be necessary. The camera housing 2030 may also have more defined windows 1705, 1710 than the minimum required, so that the same camera housing 2030 may be used for different numbers and arrangements of cameras 2025. Other such variations may be possible.

Figure 10:
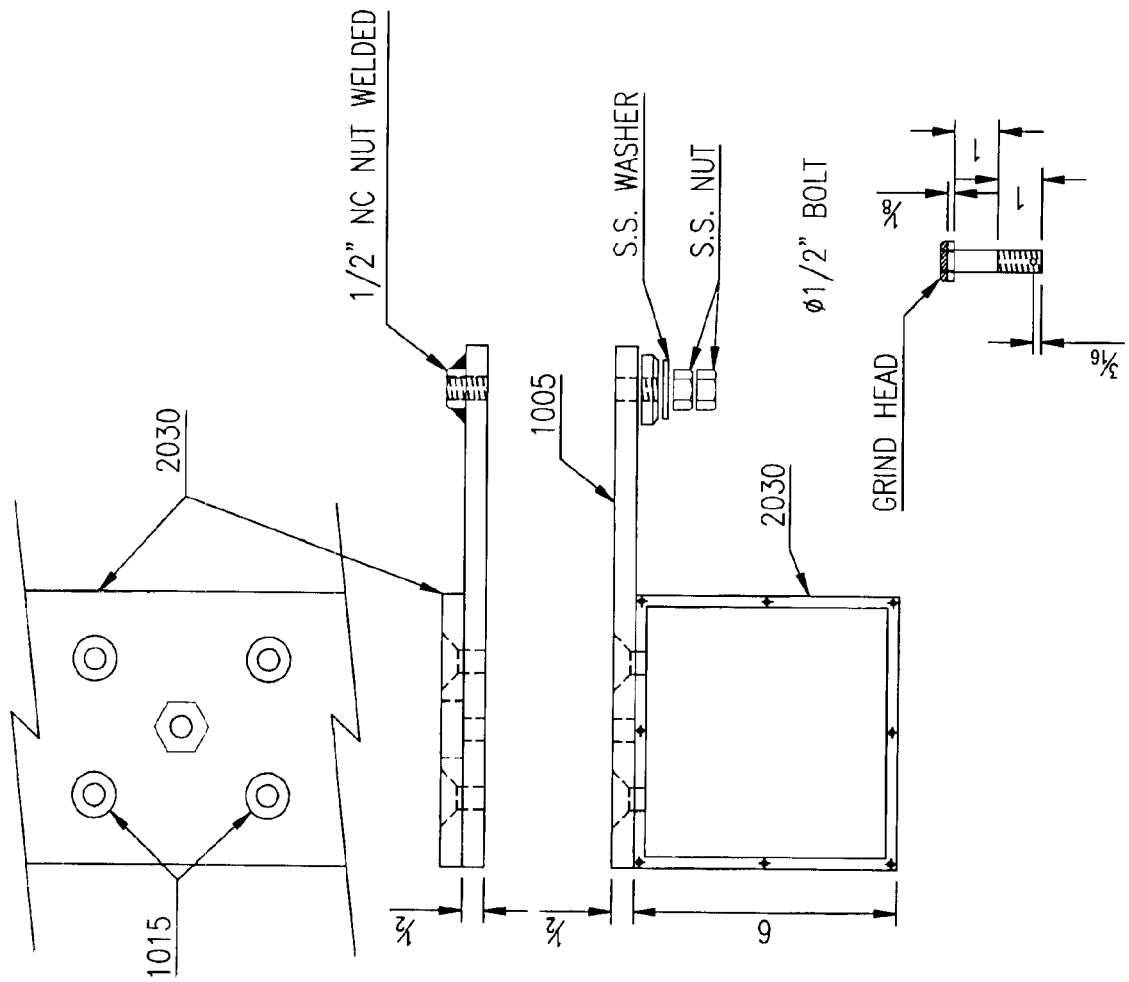
FIG. 10 shows diagrams of a camera housing pivot for mounting a camera in an example of the disclosed system for motion capture.

FIG. 10 shows a diagram of a pivot support 1005 for mounting the camera housing 2030 to the drill machine 2010 in the example system 2000. By mounting the camera housing 2030 via the pivot support 1005, the entire camera housing 2030 (and hence the cameras 2025 housed therein) may be rotated by the operator to face in the direction of the desired drilling. The pivot support 1005 may include a lock plate 1010 (also shown in FIG. 13) for locking the position of the camera housing 2030 (e.g., using locking handle screws 1015) to allow the operator to fix the camera housing 2030 orientation once the desired orientation is achieved.

Figure 11:
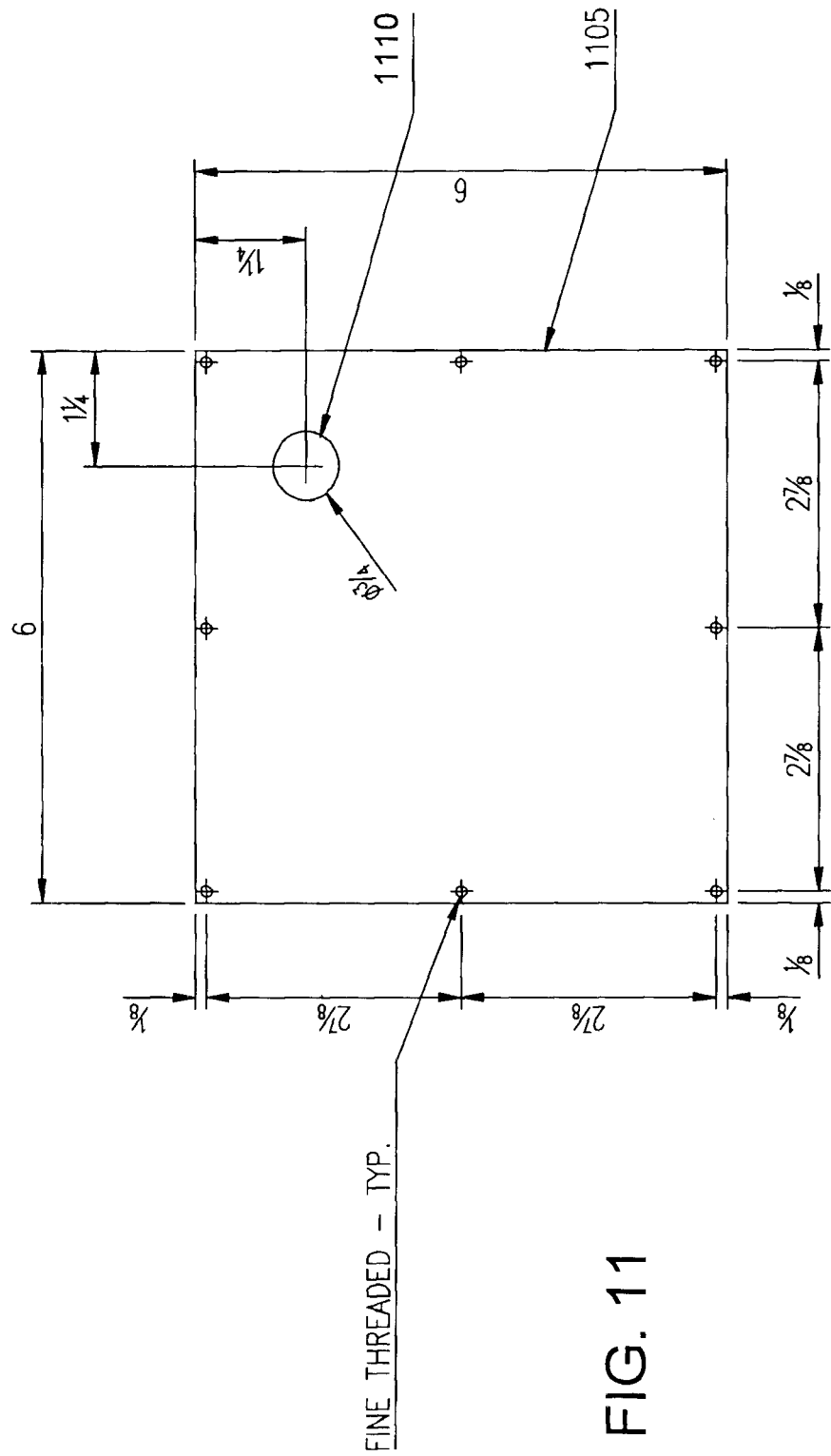
FIG. 11 shows diagrams of a camera housing end covers in an example of the disclosed system.

FIG. 11 shows a diagram of a housing end cover 1105 that may be placed over the open end of the camera housing 2030 to prevent in ingress of, for example, excess moisture and dust. There may be two housing end covers 1105, one for each end of the camera housing 2030. The housing end cover 1105 may include one or more openings 1110 to allow access for cables (e.g., to provide power, such as 12 VDC to power the lasers, from the power source 2055 and/or to provide data communications, such as image data, between the cameras 2030 and the processor 2045). In some examples, separate housing end covers 1105 may not be necessary and the camera housing 2030 may instead be integrally formed.

Figure 12:
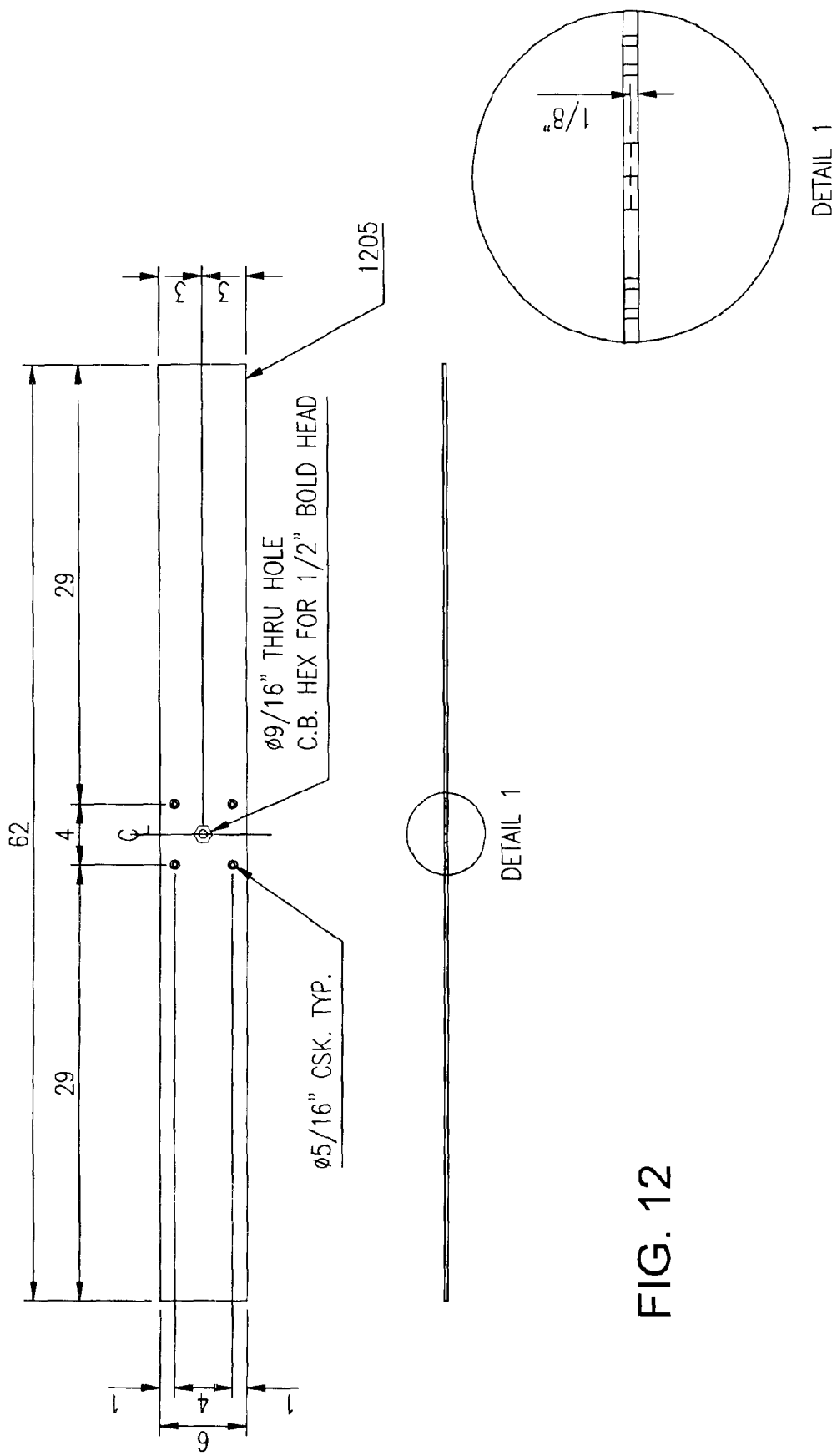
FIG. 12 shows diagrams of a camera housing supporting base plate in an example of the disclosed system.
Figure 13:
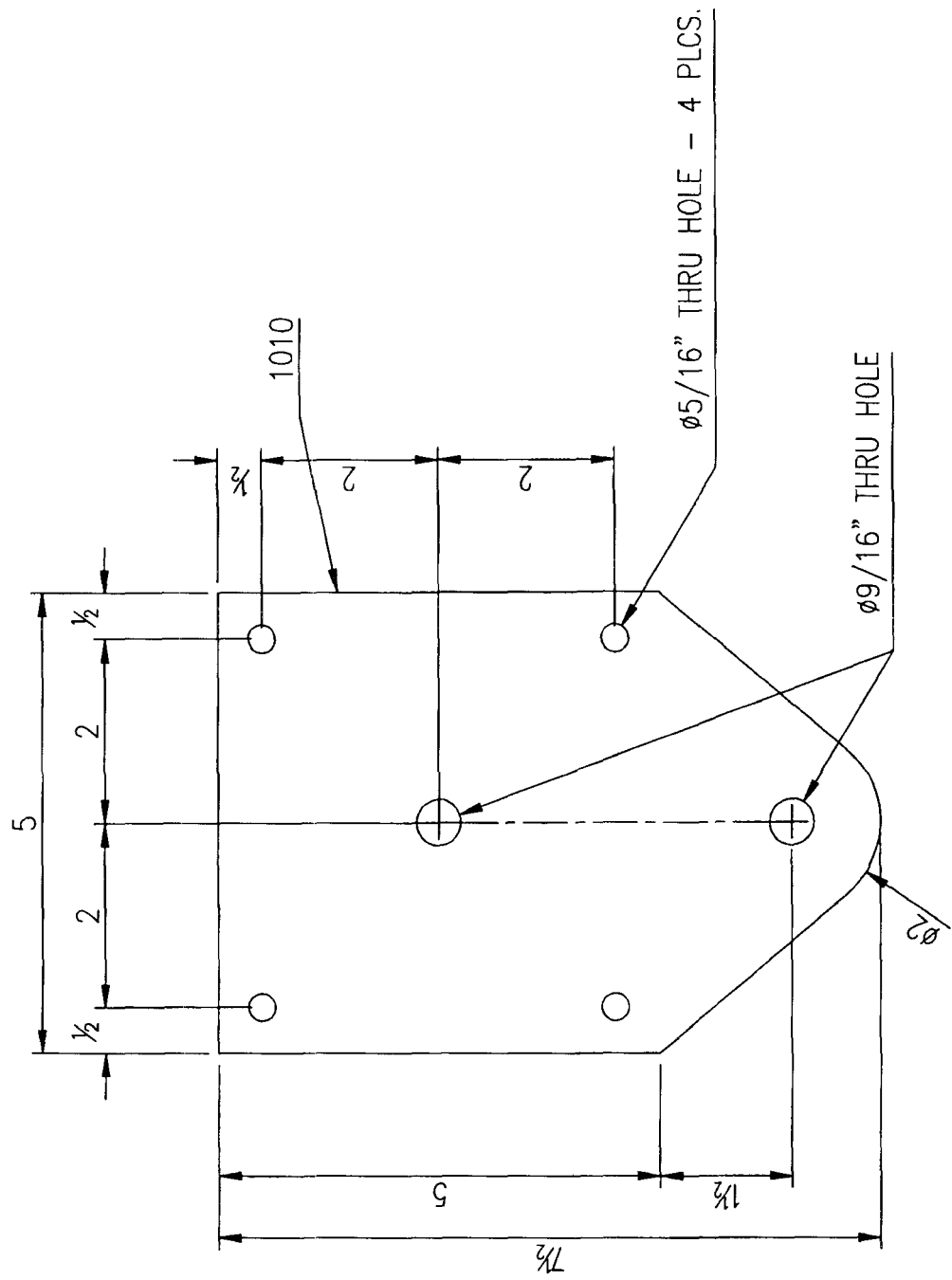
FIG. 13 shows diagrams of a camera housing pivot lock plate in an example of the disclosed system.

FIG. 12 shows a diagram of a housing base plate 1205. The housing base plate 1205 may be mounted to the underside of the roof of the drill machine 2010 to support the main mounting bolts at the top of the camera housing 2030 and holds the camera housing 2030 in place on the drill machine 2010. Other methods of mounting the camera housing 2030 may be used. In some examples, where the cameras 2025 are robust and the camera housing 2030 is not necessary, the cameras 2025 may be directly mounted to the drill machine 2010, with or without the use of the pivot support 1005 and/or the base plate 1205.

Figure 5:
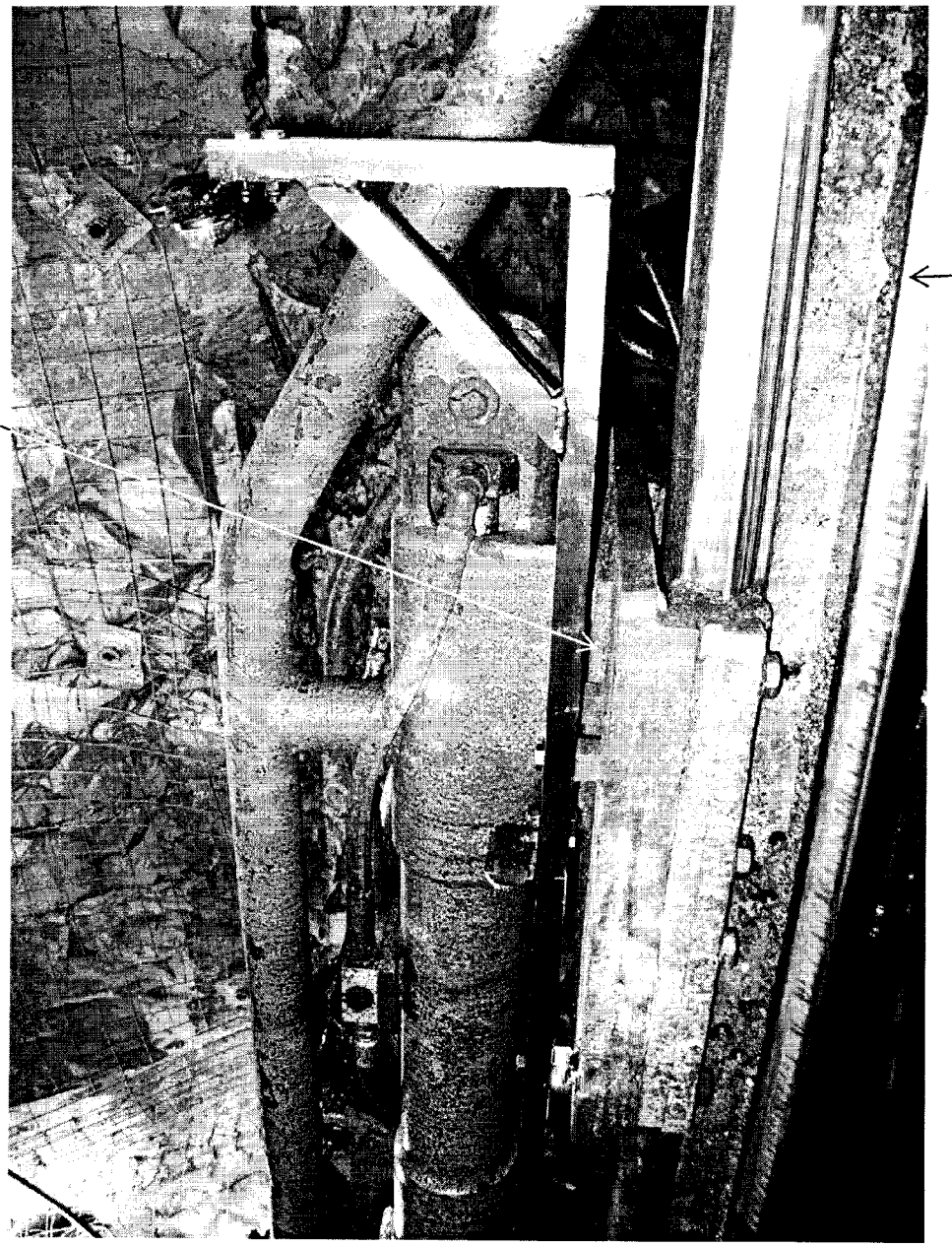
FIG. 5 shows images of example light targets on example mounting fixtures attached to the booms of the drill machine of FIG. 1.
Figure 6:
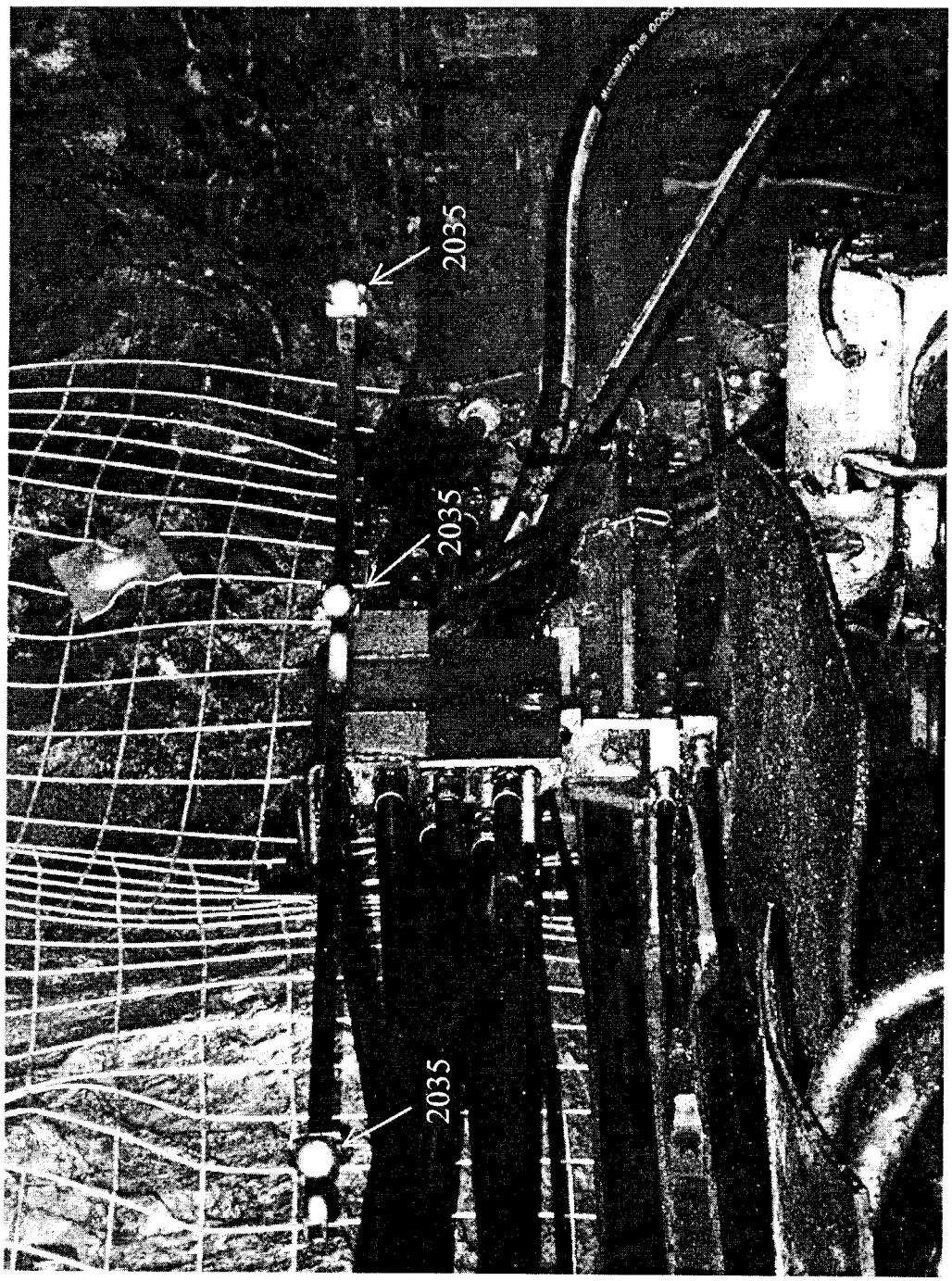
FIG. 6 shows images of the light targets and mounting fixtures of FIG. 5 as viewed in the dark.

The light targets 2035 will be described with reference to FIGS. 14, 16 and 18. FIGS. 5 and 6 are photographs showing an example of how light targets 2035 and mounting fixtures 2040 may be mounted on a two boom drill machine 2010.

FIG. 5 shows the light targets 2035 on mounting fixtures 2040 attached to the booms 2015 of the drill machine 2010. The light targets 2035 may be mounted (via mounting fixtures 2040, if used) on different portions of the booms 2015 and/or drill machine 2010 to allow for motion capture of pertinent components and/or to help ensure that the light targets 2035 are visible to the cameras 2025. FIG. 6 shows how the light targets 2035 may be viewed in a poorly lit or dark environment.

In the example system 2000, there may be 12 light targets 2035 in total, which may be mounted in sets of three using mounting fixtures 2040. As shown in FIG. 18, two mounting fixtures 2040, with three light targets 2035 each may be mounted on opposite sides of each boom 2015. In some examples, where the light targets 2035 are active light sources, a group of light targets 2035, for example the light targets 2035 mounted on a single mounting fixture 2040, may be wired together to a single power source (e.g., a battery), for example with a common switch for activation, which may be more convenient to mount and/or activate. In other examples, each of the light targets 2035 may be separately powered (e.g., each having its own battery).

The light targets 2035 may be off-the-shelf components. For example, LED lights, especially those with low power consumption, water resistance and vibration resistance, may be suitable light targets 2035. Other smaller lights may be used Other types of light targets 2035 may be suitable depending on the applications, for example infrared lights may be used in unlit conditions. The light targets 2035 may be provided on the mounting fixture 2040 (e.g., an aluminum frame), which fixes the light targets 2035 at known positions relative to each other. The mounting fixture 2040 may be in turn mounted on the subject to be tracked, in the booms 2015 of the drill machine 2010, one on the top and one on the bottom of each boom 2015, so that at any time at least one light fixture 2040 is visible per boom 2015.

In this example, there are three light targets 2035 mounted on a mounting fixture 2040, although other examples may have more or less light targets 2035 per mounting fixture 2040.

In this example, the light targets 2035 are light sources (e.g., LED lights), although in other examples the light targets 2035 may be reflective targets. Such reflective targets may be used in conjunction with another light source, such as a flashing light source to illuminate them, or may be illuminated by ambient light. The light targets 2035 may be distinctive in shape, intensity and/or color from the non-target environment to allow the light targets 2035 to be distinguished in the image processing, as will be described further below.

Figure 14:
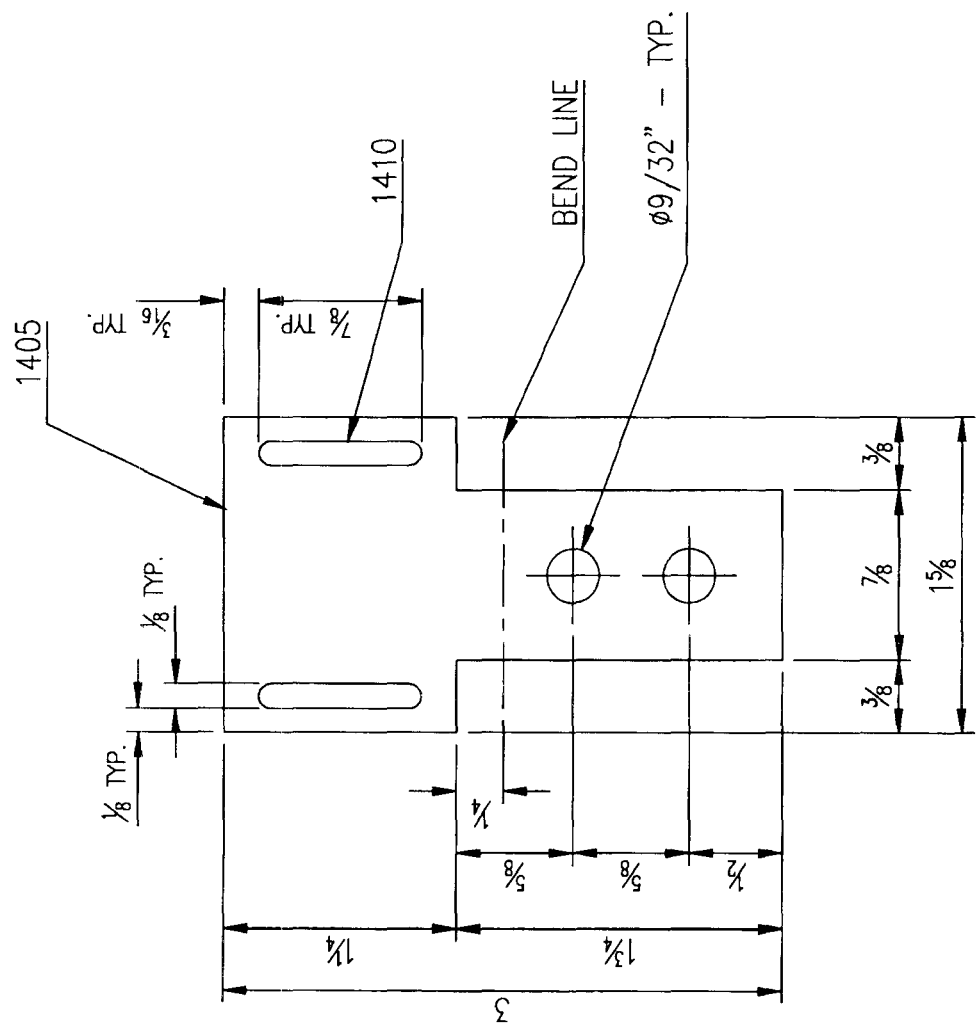
FIG. 14 shows diagrams of an example light support for a mounting fixture for a light target in an example of the disclosed system.

FIG. 14 shows a diagram of a light target supporting bracket 1405. Each light target supporting bracket 1405 may support one light target 2035 on a mounting fixture 2040. The light target 2035 may be fixed to the light target supporting bracket 1405 through removable or undoable fasteners, such as Velcro strips (which may be fed through openings 1410 in the bracket 1405). The light target supporting bracket 1405 may be removably or permanently fixed to the mounting fixture 2040. The use of a removable or undoable fastener for fixing the light target 2035 may be useful for relatively quick and easy removal and replacement of a light target 2035, for example when the light target 2035 is damaged or reaches end of life. In some examples, the light target supporting bracket 1405 may not be used and the light target 2035 may be fixed directed onto the mounting fixture 2040.

Figure 16:
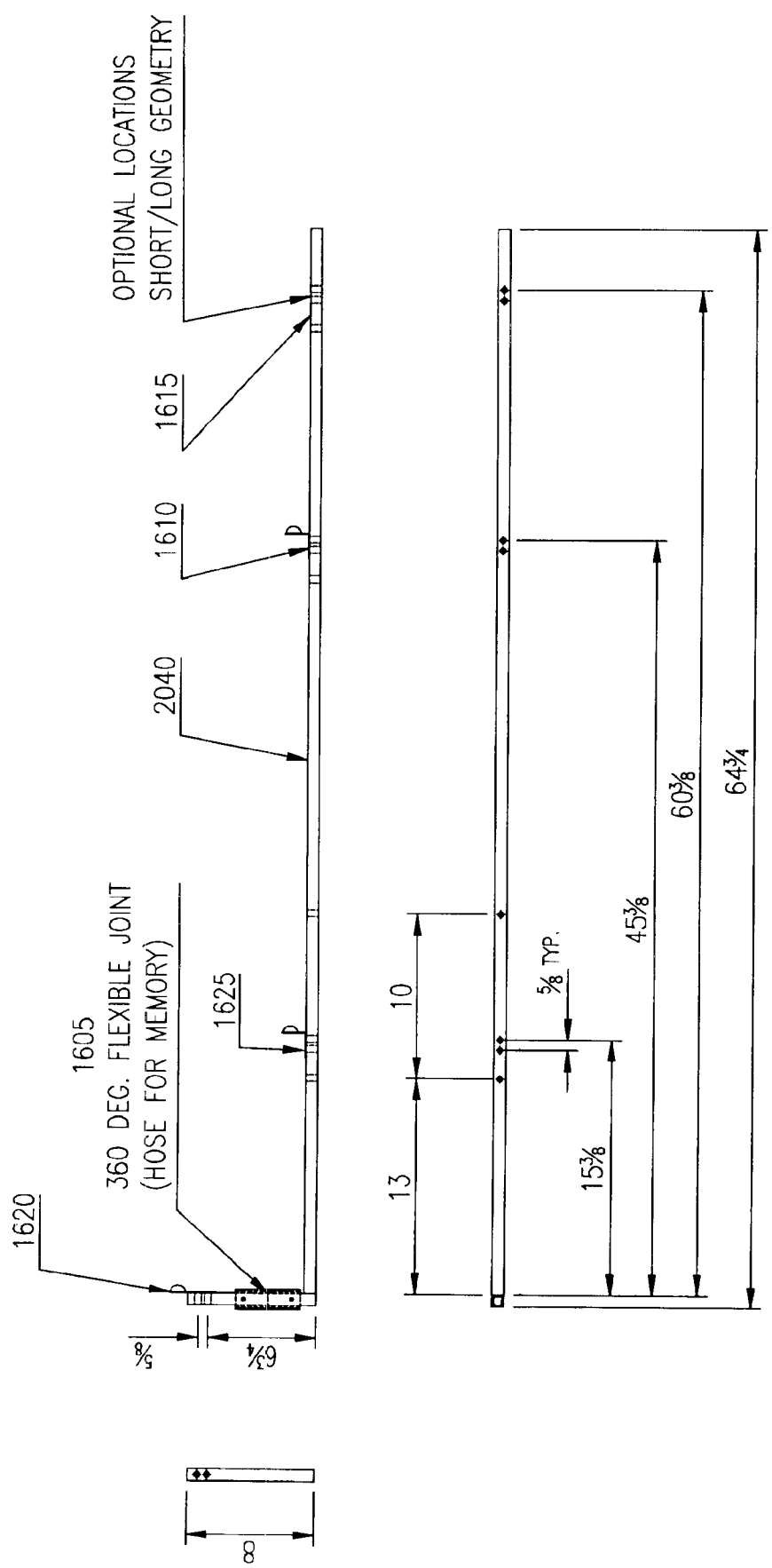
FIG. 16 shows diagrams of an example mounting fixture for a light target in an example of the disclosed system.

FIG. 16 shows a diagram of a mounting fixture 2040 for mounting the light targets 2030 to the subject. In this example, the mounting fixture 2040 may be made of aluminum or any other relatively rigid material. The mounting fixture 2040 in this example is configured to position the light targets 2035 in a linear arrangement, although other arrangements (e.g., angular, random, different heights, etc.) may also be used, as appropriate. The mounting fixture 2040 may include a flexible joint 1605 (e.g., a 360 degrees flexible joint) for mounting a light target 2035. The mounting fixture 2040 may also include an excess of openings so that the light targets 2035 may be mounted at multiple positions and in different configurations along the mounting fixture 2040. In some examples, the light targets 2035 may be mounted to the mounting fixture 2040 with clamps, for example, instead of screws, or bolds, such that position of the light targets 2035 along the mounting fixture 2040 may not be limited. In other examples, the mounting fixture 2040 may have defined openings for mounting the light targets 2035, such that the possible configurations of the light targets 2035 may be relatively limited.

In this example, the mounting fixtures 2040 configuration may be fixed to opposite sides of the booms 2015 such that the cameras 2025 may have a view of the light targets 2035 in the desired geometry no matter whether the boom 2015 is rotated up or down. As will be described below, in some examples, at least three light targets 2035 on the mounting fixture 2040 must be clearly seen to calculate a 3D location for the boom 2015. In this example, the mounting fixture 2040 provides fixed positions 1620, 1625 for the two light targets 2035 that are most proximal to the operator, and two alternate positions 1610, 1615 for the most distal light target 2035. If the distal light target 2035 is positioned in the most distal position 1615, then the "long geometry" is defined. This long geometry is typically used when the light fixture 2040 is mounted on the left hand boom 2015. If the distal light target 2035 is positioned in the more proximal position 1610, then the "short geometry" is defined. This short geometry is typically used when the light fixture 2040 is mounted on the right hand boom 2015. The use of different geometries for each boom 2015 may allow for the left and right booms 2015 to be distinguished from each other. In other examples, other methods of distinguishing the booms 2015 may be used (e.g., different light intensities, colors, etc.)

In this example, the mounting fixture 2040 may position the light targets 2035 at distances of 15.375 inches and 45.375 inches from the most proximal light target 2035, in the short geometry; and at distances of 15.375 inches and 60.375 inches from the most proximal light target 2035, in the long geometry. Other distances and configurations may be possible. The mounting fixture 2040 may be considered to be expendable and may be made of a relatively cheap yet rigid material, such as aluminum.

Generally, the configuration of the light targets 2035 on each mounting fixture 2040 may be pre-defined to be recognized by the processor 2045 in the image processing method described below. The number, shape, color, intensity and/or relative positions and geometry of the light targets may be pre-defined and/or variable in the image processing method. The mounting fixture 2040 may be modified to suit the application. In some examples, the mounting fixture 2040 may not be necessary and the light targets 2035 may be directly fixed to the subject in the appropriate geometry. For example, the light targets 2035 may be provided with fasteners or adhesives to be fixed directly on a boom 2015.

The miner box is a housing that contains the touch screen providing feedback to the miner, the computer processing and converting the video images from the cameras into information on the orientation of the drill booms for the miner, the power cord to the jumbo drill to collect 110 volts, the central power distribution to all components of the system, including the conversion of 110 VAC to 12 VDC for the ventilation fan and the lasers, finally also the USB connection for the technicians external field computer to diagnose the miner box computer if required and to receive calibration constants and logs of the drilling completed by the miner.

Feedback information about the position and/or movement of the tracked subject (e.g., booms 2015) may be provided to the operator. This feedback information may be provided by the display 2050, which may be a touch sensitive display, located at the front of the cabin 2020. This location may be chosen based on the preferred or optimal view point of the operator. The feedback information may include, for example, the position and orientation of each tracked boom 2015. Additional useful information for feedback to the operator may include, for example, the rate of drilling, the depth of the drilled hole as it progresses, the grade of the ore (e.g., extrapolated based on the parameters, such as drill speed, of the drilling), drilling parameters of feed and rotation pressure, the name of the heading, the date, efficiency parameters including the burden and spacing of the holes as they are drilled, the blasting parameters (e.g., the sequence that the holes should be blasted, based on the success of the planned burden) and spacing of the toes of the holes. The operator can use this feedback information to control movement and operation of the drill booms 2015 and/or the drill machine 2010.

In this example, the display 2050 and the processor 2045 are both provided by a low-power, portable, low footprint computer, such as a Mac mini. The use of a low-power and portable system may be suitable for an underground environment, because of the limited space and power available. This may be counterintuitive compared to conventional motion capture systems and methods, such as in the movie and entertainment, sports and surveillance industries, where large amounts of processing power is desirable for processing many tracked points at a high rate of motion capture. Nevertheless, more powerful computing components and larger components may be employed if suitable.

In the example system 2000, the display 2050 and the processor 2045 (and optionally the power source 2055) may be housed in a processor housing 2060. In some examples, each of these components 2050, 2045, 2055 may be housed in separate housings 2060, or one or more of these components 2050, 2045, 2055 may be robust enough to not require any housing 2060.

Figure 15:
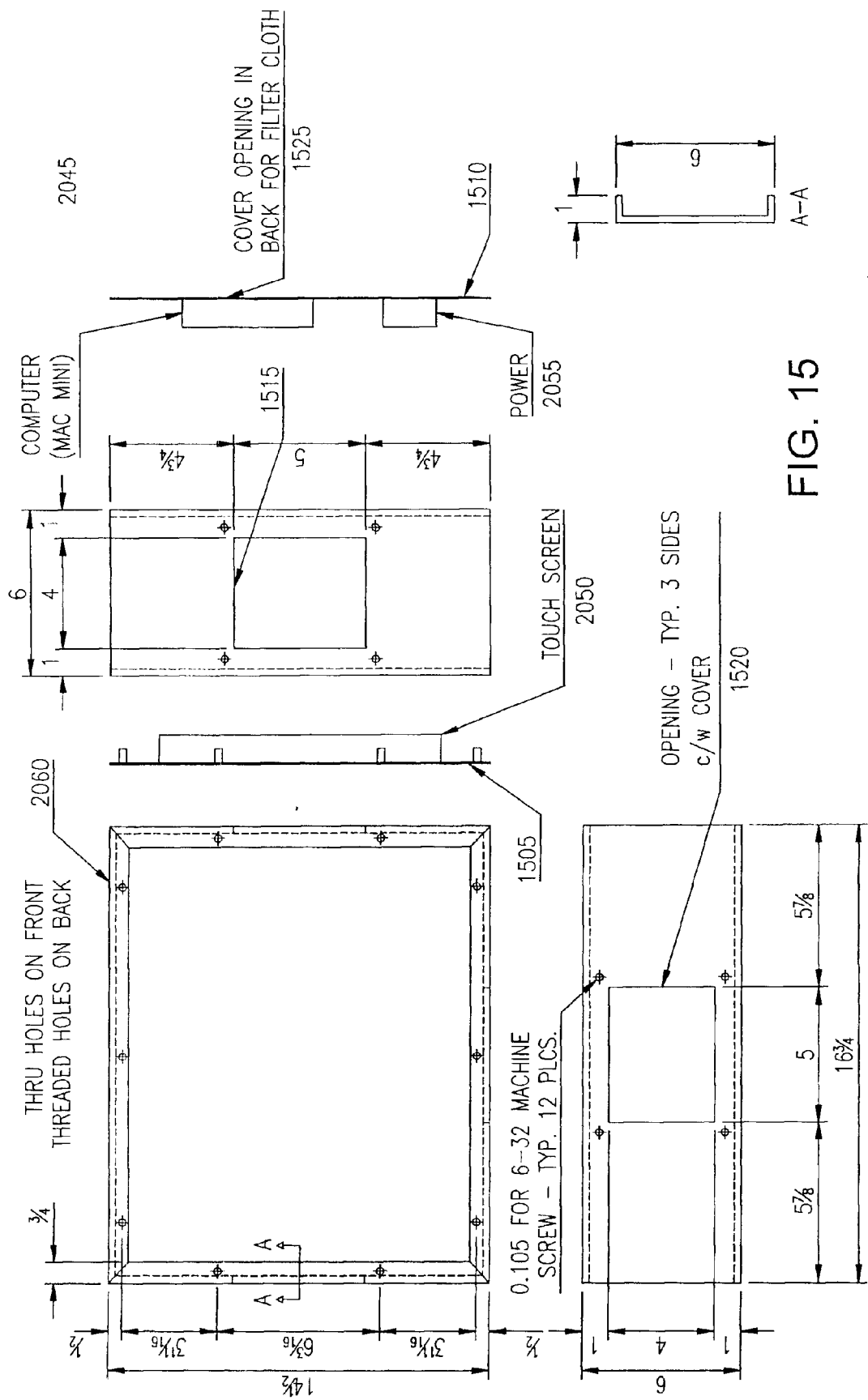
FIG. 15 shows diagrams of a housing for a processor and display in an example of the disclosed system.

FIG. 15 is a diagram of an example processor housing 2060. The exploded view on the right hand side of FIG. 15 shows how the display 2050 may be attached to the front 1505 of the processor housing 2060, and how the processor 2045 and power source 2055 may be attached to the rear 1510 of the processor housing 2060. The processor housing 2060 may also include an opening 1515 to provide an access point for a power supply cable as well as cables for communications with other components (e.g., cameras 2025 and lasers) of the system 2000. The bottom of the processor housing 2060 may include an opening 1520 to allow for a fan to draw air through the processor housing 2060, to cool the processor 2045, for example. The processor housing 2060 may also include a filter 1525, for example positioned at the rear 1510 of the processor housing 2060, to filter dirt and/or moisture from the air drawn into the processor housing 2060. The use of the filter 1525 may help to reduce damage to the display 2050, processor 2045 and/or power source 2055.

Figure 7:
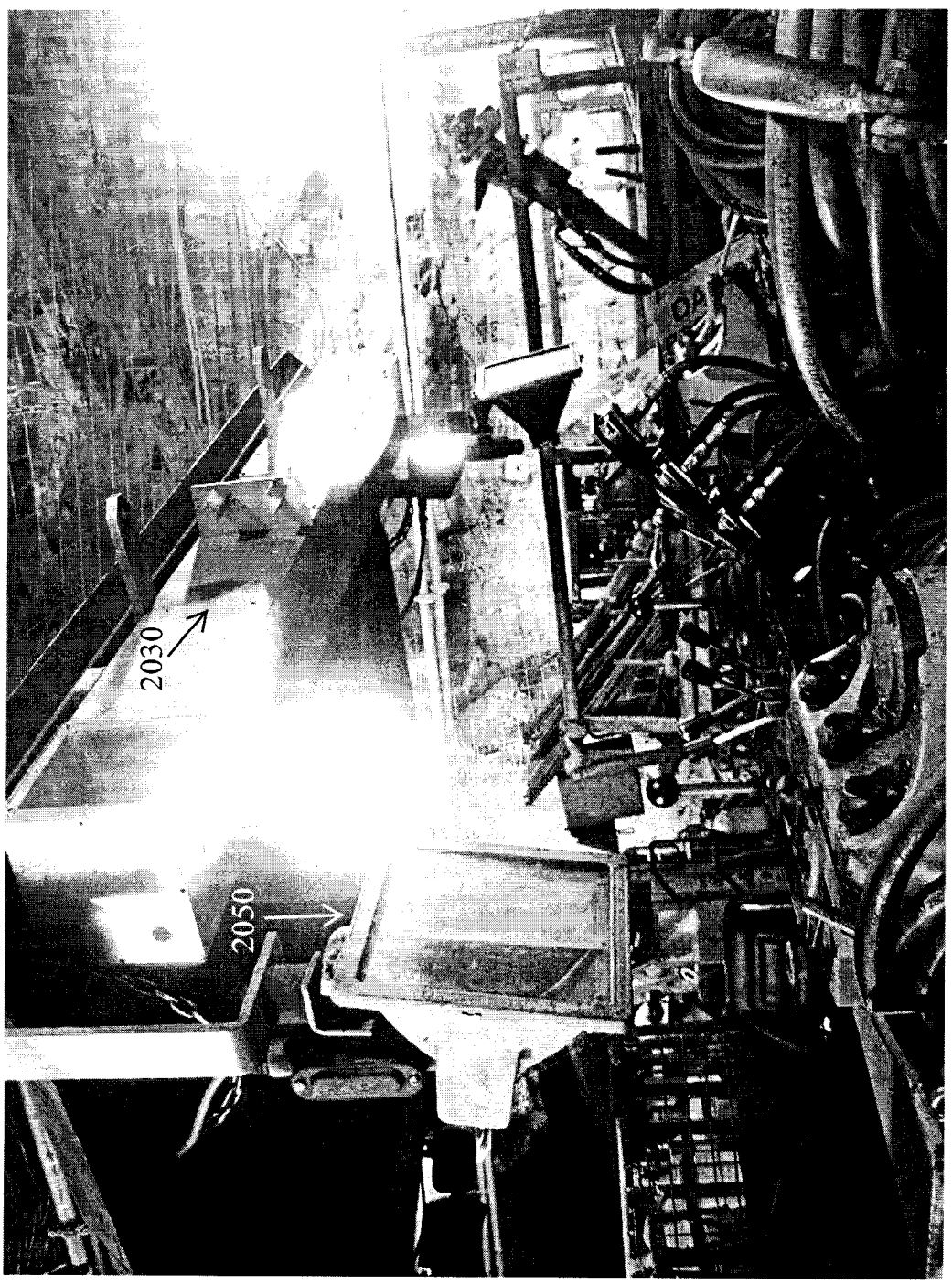
FIG. 7 shows example images of a display provided to an operator while drilling.
Figure 9A:
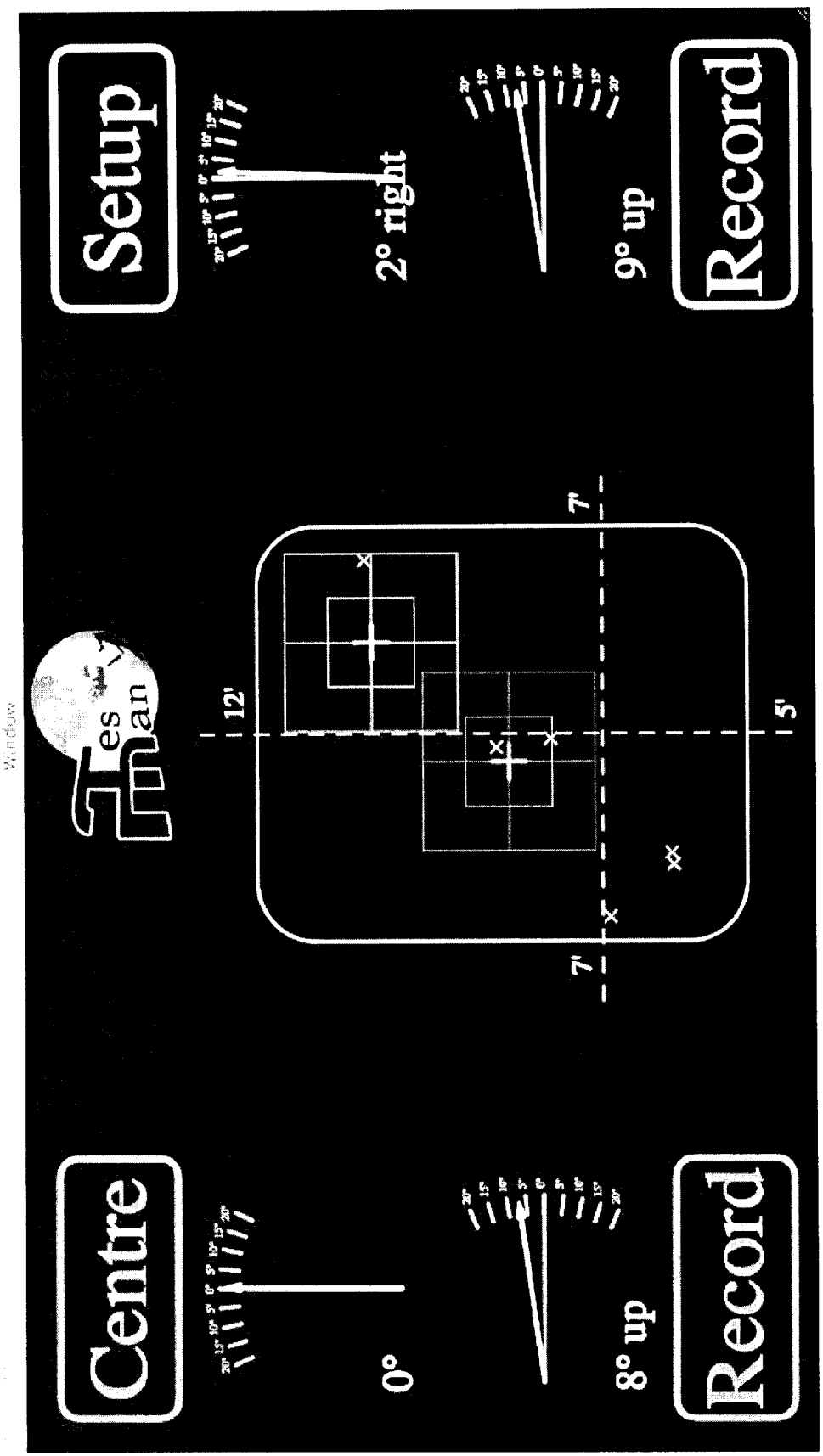
FIGS. 9A and 9B shows example displays providing feedback.
Figure 9B:
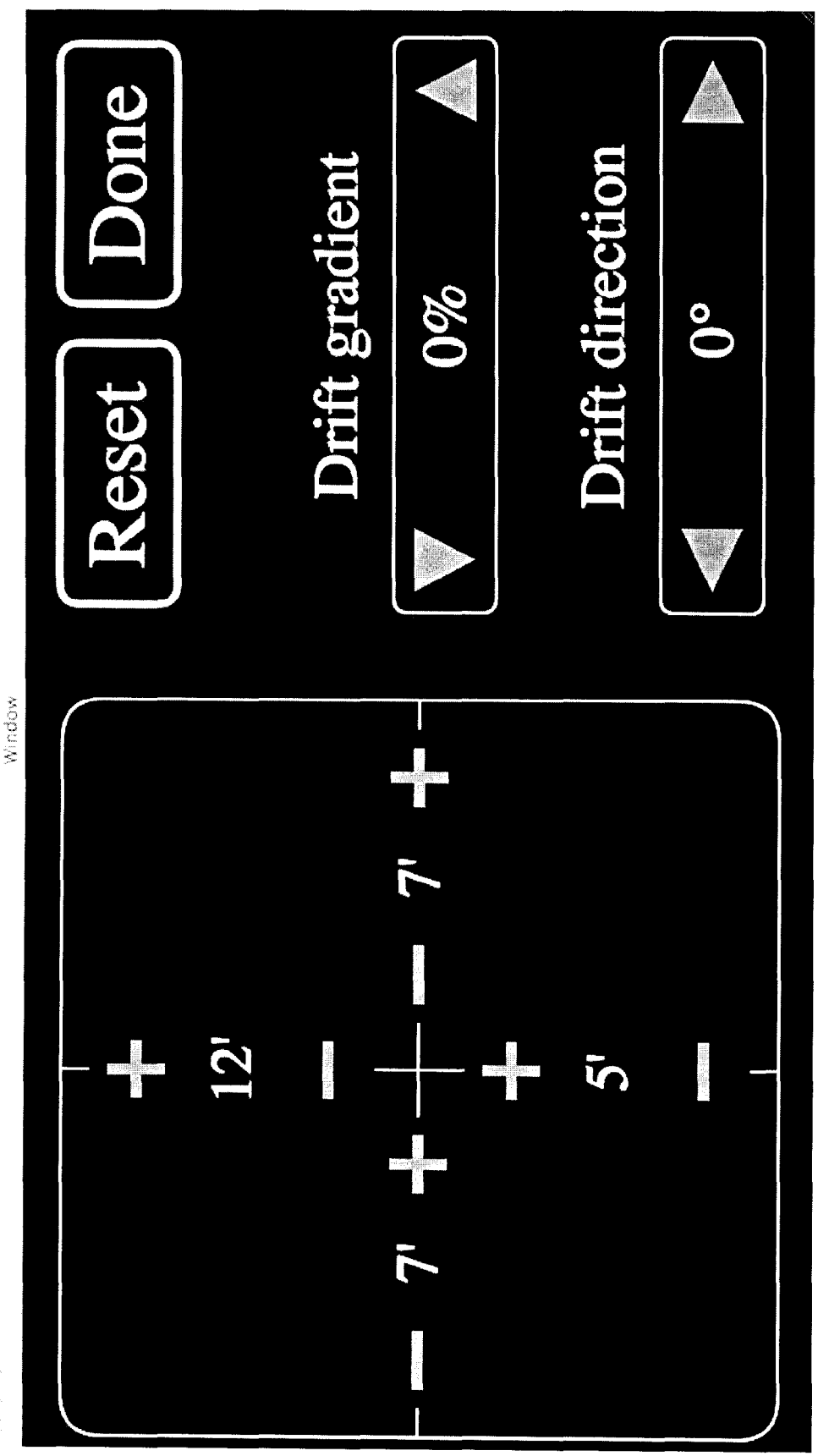

FIGS. 7 and 9A-9B are photographs showing examples of how the display 2050 may be implemented in a two boom drill machine 2010, to provide feedback to the operator. The feedback in the examples shown may include displaying vertical and horizontal angles for the right and left booms and a planned toe map in the centre of the display. The display 2050 may be separate from or incorporated into the operating screen of the drill machine 2010, for example at the bottom right of the operating screen.

FIG. 9A may serve as the main feedback display, in this case for a two boom drill machine 2010. The vertical and horizontal angles for the booms are shown on the left and right sides of the display, corresponding to the left and right booms 2015, respectively. For larger numbers of booms, this information may be displayed in other configurations, or the user may be provided an option to scroll through the information for different booms. The center of the feedback shows the planned face at the toe of the holes (e.g., according to a predetermined drilling plan during calibration). This may help the operator to place the toes of the holes to be drilled. This center graphic may be updated in real-time to show where the toe being drilled by each boom will end up, based on extrapolation of the boom position, for example. The display also includes a "Setup" button, which when selected (e.g., by touching the appropriate area of a touch-sensitive display) may bring up the screen of FIG. 9B. Other feedback, such as audio cues, may be used to convey information to the operator.

FIG. 9B allows the operator to set up a reference point for drilling. The reference point may be located using suitable techniques, such as using survey chains. The size of the tunnel to be drilled is measured from the reference point in terms of the distance up, down, left and right of the reference point. The gradient of the tunnel may also be inputted as a percentage up or down, or other suitable indicator. During setup, the cameras 2035 may be oriented to match the viewing direction with the tunnel direction. This setup screen may also provide an option to input an additional angle for the tunnel to travel, for example 45 degrees left or right, or other suitable indicator. This information may be used in calculating the feedback to be provided to the operator. Once this information has been inputted, the operator may select "Done", or some other form of input, to finalize.

Returning to the main screen in FIG. 9A, the operator may center the booms 2015 at the reference point on the tunnel face and select "Centre" to indicate that the booms 2015 have been centered. The operator may then begin drilling, and the feedback may display the current position (e.g., the toe being drilled, as shown in the center of the display) and orientations (e.g., vertical and horizontal angles, as shown in the left and right portions of the display) of the booms 2015.

Although the above example describes certain embodiments and arrangements, variations may be suitable for different applications and environments. For example, there may be more or fewer cameras 2025 used and the cameras 2025 may be situated in different locations. Similarly, the number and configuration of the light targets 2035 may be varied, or alternatively no light targets may be used but instead edge detection (e.g., of the bottom edge of the boom limbs) may be used to monitor location and movement of the subject.

The position and movement of each of the light targets 2035 may be captured and tracked by any of the cameras 2025 that have a generally uninterrupted line-of-sight to each respective light target 2035. The moving locations of the light targets 2035 may be captured by the cameras 2025 and converted in real-time, or with an industrially suitable delay, into a time-series of 3D co-ordinates, as will be described in detail below. These 3D co-ordinates may be displayed in real-time, or with an industrially suitable delay, on the display 2050 as the orientation of each tracked boom 2015. The orientation of each boom 2015 may be depicted as angles in the vertical and horizontal axes defined for each tracked boom 2015.

In some examples, the dimensions (e.g., width, height, depth) of the desired tunnel/drift face to be drilled may also be pre-specified (e.g., by the operator) and included in the feedback provided to the operator. This information about the desired tunnel/drift face may be added to the displayed 3D orientation data of the boom(s) 2015 to generate a map showing where the expected resulting end/toe of the blasthole will be, based on the actual orientation of a boom 2015, relative to the desired end/toe face to be drilled. The expected resulting end/toe of the blasthole may be extrapolated, as discussed below, based on the calculated current orientation of the drill boom 2015 and drill slide. This feedback may provide the operator with information to help accurately position the drill slide so that the resulting end/toe of the blastholes match the desired locations (e.g., evenly placed).

The disclosed system may be configured to be retrofitted to any drill machine currently in use in the mining industry, and is expected to be fittable to future machines and apparatuses.

An example method for motion capture in an underground environment is described below. This method may be carried out using the system 2000 described above, or a variation thereof. For example, the system 2000 described above may include a processor 2045 for receiving tracking data from the cameras 2025 and for providing calculated information to be displayed on a display 2050.

Figure 20:
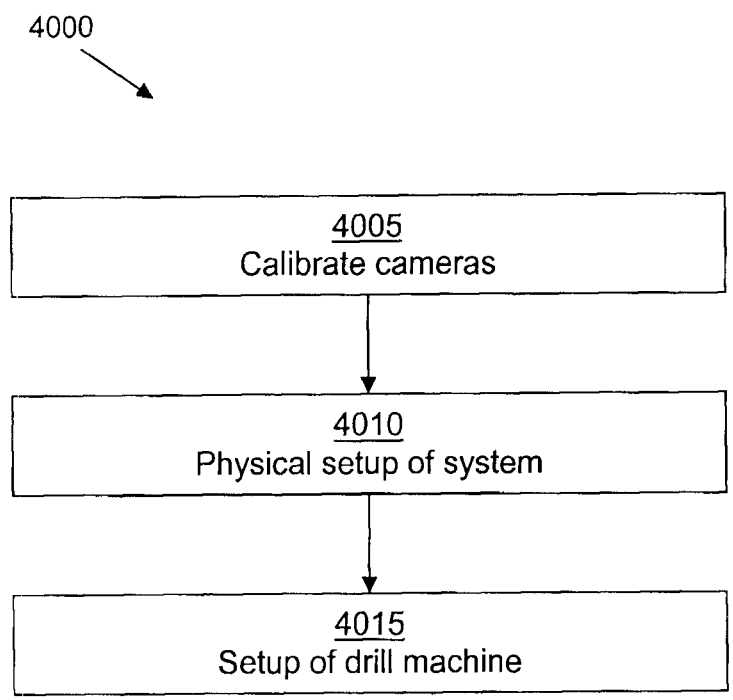
FIG. 20 is a flowchart illustrating an example calibration method for the system of FIG. 18.

The example method may begin with setup and calibration of the system 2000 calibrated. An example setup and calibration method 4000 is illustrated in the flowchart of FIG. 20.

At step 4005, the cameras 2025 may be calibrated. This may be done once the cameras 2025 are in their respective relative fixed positions (e.g., mounted on a tray to be placed in the camera housing 2030). Calibration of the cameras 2025 may be carried out only the first time the system is initiated, or only when one or more cameras 2025 is moved or removed from their relative fixed positions (e.g., if a camera 2025 fails and requires replacing). Calibration of the cameras 2025 may generate one or more calibration constants to be used in the image processing method described below for that particular set of cameras 2025 in that particular configuration. Calibration of the cameras 2025 may take place before the cameras 2025 are placed in the camera housing 2030, for example in a lab or workshop environment.

Calibration of the cameras 2025 may include physically fixing the cameras 2025 in their relative positions (e.g., mounting the cameras 2025 on a tray, before being placed into the camera housing 2030) and focusing the camera lenses. A reference image may then be captured using each camera 2025. The pixel positions of each image are processed according to the method described below. The center pixel of each image is identified, as well as the respective intensities. The rotation and intensities of each image is related to each other and balanced out. The ratios of the settings (e.g., relative contrast and brightness settings) used to balance out the images, for example such that all the cameras 2025 capture a given light intensity with the same pixel value, are stored as calibration constants.

At step 4010, the system 2000 may be physically set up in the operating environment (e.g., in an underground mine). This may include the assembly of the processor housing 2060, the camera housing 2030, and the mounting brackets 1405, the connection of any cables, the attachment of the light targets 2035 to the mounting fixtures 2040 and the attachment of the mounting fixtures 2040 to the subject (in this case, the booms 2015). This may be done only when the system 2000 is first assembled, or only when one or more components of the 2000 is added, moved or removed (e.g., for replacing one or more components). Any calibration constants (e.g., as determined in 4005) may be entered into the system 2000, for example by inputting the values into the processor 2045.

At step 4015, the drill machine 2010 is set up, for example by the operator according to standard mining practice. The setup of the drill machine 2010 may take place every time before initiating drilling, and may include the process of recording the set up data (e.g., as displayed on the display 2030) so that a log of the set up results can be printed later for comparison with the actual product of the blasted face of the tunnel.

Set up of the drill machine 2010 may include one or more of the following, and may include all of the following: i) moving the drill machine 2010 into the tunnel in front of the face to be drilling; ii) leveling the drill machine 2010 side to side and/or front to back; iii) marking the desired grade line of the tunnel (e.g., on the wall, such as the left hand wall, of the tunnel); iv) marking the grid of collars on the face; v) placing the end of the boom 2015 (e.g., the left hand boom 2015) on the face; vi) leveling the boom 2015 (e.g., the left hand boom 2015) with the marked grade line; vii) activating the processor 2045; viii) checking that all the light targets 2035 are activated (in the case of light generating light targets 2035) and in good condition; ix) in the setup screen presented on the display 2030, entering initial conditions such as offsets of the tunnel's planned outline, the angle (e.g., as a percent) of the boom 2015 (e.g., the left hand boom), the tunnel name, the camera direction (e.g., zero if the camera housing 2030 is properly aimed); x) checking that the boom 2015 (e.g., the left hand boom 2015) is showing a clear angle; xi) inputting confirmation, for example using the interface provided by the display of FIG. 9B, that the setup is complete.

As part of this setup, the operator may enter setup conditions, for example using the display of FIG. 9B. The operator may enter the grade of the tunnel to be drilled, any offsets in the boom 2015 (e.g., the left hand boom 2015) and any drift direction for the tunnel. The setup may also include centering the feedback display of FIG. 9A. The operator may position the boom 2015 (e.g., the left hand boom 2015) at the reference point and center the display by indicating (e.g., by selecting "Centre") that the boom 2015 (e.g., the left hand boom 2015) is centered at the reference point.

The operator may then begin drilling. After collaring each drill hole, the operator may initiate recording of data, for example by selecting "Record" or by providing some other suitable input, such as using the display shown in FIG. 9A. When recording of data is initiated, the motion capture method, such as that described with reference to FIG. 19 below, may commence.

Some portions (e.g., 4005, 4010) of the method 4000 may be carried out only when the system 2000 is used for the first time or when one or more components of the system is moved, replaced, added or otherwise changed. Other portions (e.g., 4015) of the method 4000 may be carried out every time motion capture is initiated (e.g., at the start of every drilling process or at the start of every workday).

Figure 19:
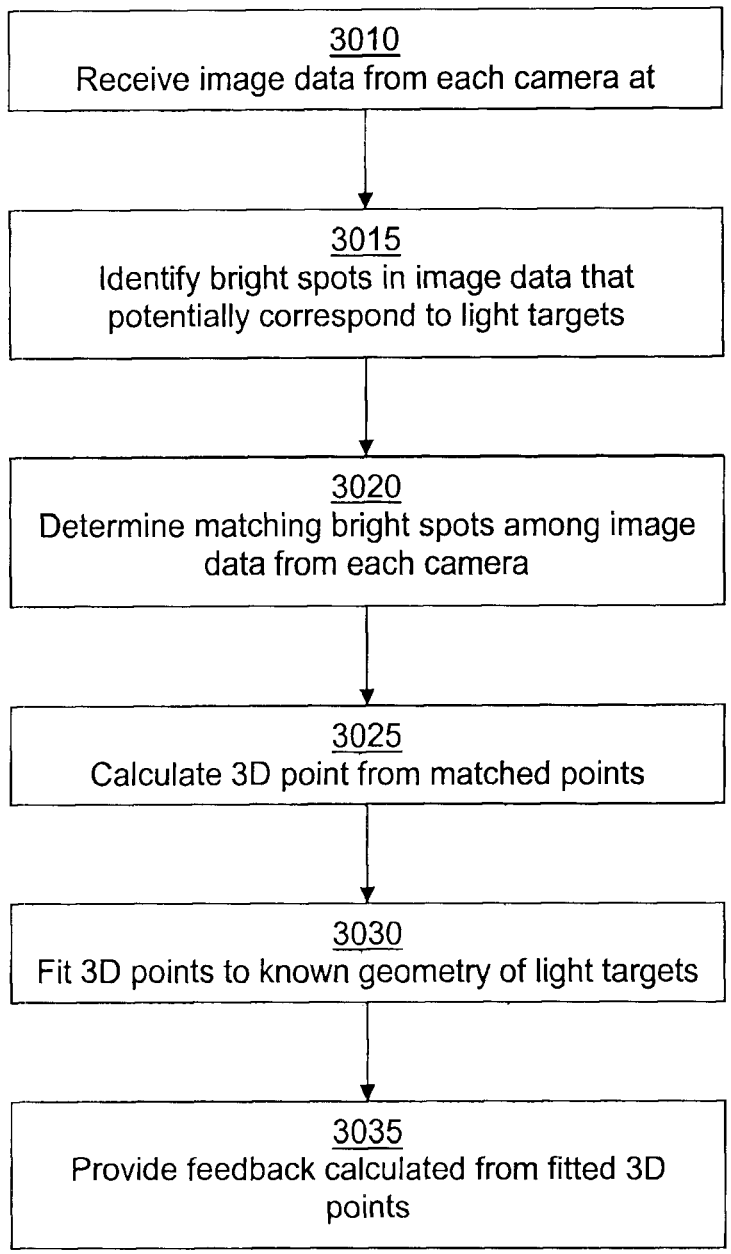
FIG. 19 is a flowchart illustrating an example of the disclosed method for motion capture.

Reference is now made to FIG. 19 showing a flowchart illustrating an example method 3000 for motion capture. After calibration 4000 is complete, the method 3000 may perform image processing of data captured by the cameras 2025.

At 3010, the processor 2045 may receive image data captured at each camera 2025. A set of image data captured at a camera 2025 may represent an image of one or more light targets 2035 at a given time. Each set of image data may thus represent the view of each camera 2025 at a given time, and the total image data communicated to the processor 2045 at a given time may include multiple sets of image data, specifically one set of image data from each of the cameras 2025. This image data may be automatically transmitted by each camera 2025 at fixed intervals (e.g., every half second, but significantly longer or shorter intervals, including irregular intervals, may be suitable). This image data may also be requested by the processor 2045 at fixed intervals (e.g., every half second, but significantly longer or shorter intervals, including irregular intervals, may be suitable) or in response to an update request from the operator. Although the image data may be communicated from the cameras 2025 to the processor 2045 at fixed intervals, the cameras 2025 may capture image at a higher or lower rate than the rate of data communication.

Camera pairs may be pre-defined at the processor 2045, for example as part of the calibration step 3005. For example, in the case where there are three cameras A, B, C, camera pair 1 may be defined as the pair A-B, camera pair 2 may be defined as the pair B-C and camera pair 3 may be defined as the pair A-C. Other such pairings may be defined for different camera numbers and configurations. Although in the present example all possible camera pairings are defined, in other examples the defined camera pairs may not cover all possible camera pairings, such as where there is a large number of cameras 2025 and/or where cameras 2025 are directed at different viewpoints.

The image data captured from each camera 2025 may be individually processed before pairing up the image data according to defined camera pairs.

At 3015, the processor 2045 may identify one or more spots in each set of image data that potentially corresponds to a light target 2035. Whether a given spot is considered to potentially correspond to a light target 2035 may be dependent on the specific color, shape and/or brightness of the spot. The processor may carry out an algorithm that identifies all spots matching a set of criteria to potentially correspond to a light target 2035. Such spots may be referred to as "bright spots", and information about these bright spots (e.g., x and y position, intensity, color, etc.) may be stored in a memory of the processor 2045 for further processing. A bright spot may cover multiple pixels in the image data.

For example, a light target 2035 may be associated with a predefined range of shapes, light intensities, sizes and/or colors and any bright spot falling outside the predefined range may be determined to be not a light target 2035 and discarded. The predefined range may be predefined by an operator or during calibration of the system, for example. Alternatively or in addition, a predefined range of sizes and/or colors may be associated with the non-target environment, and any bright spot falling within this predefined range may be determined to be not a light target 2035 and discarded.

Figure 21:
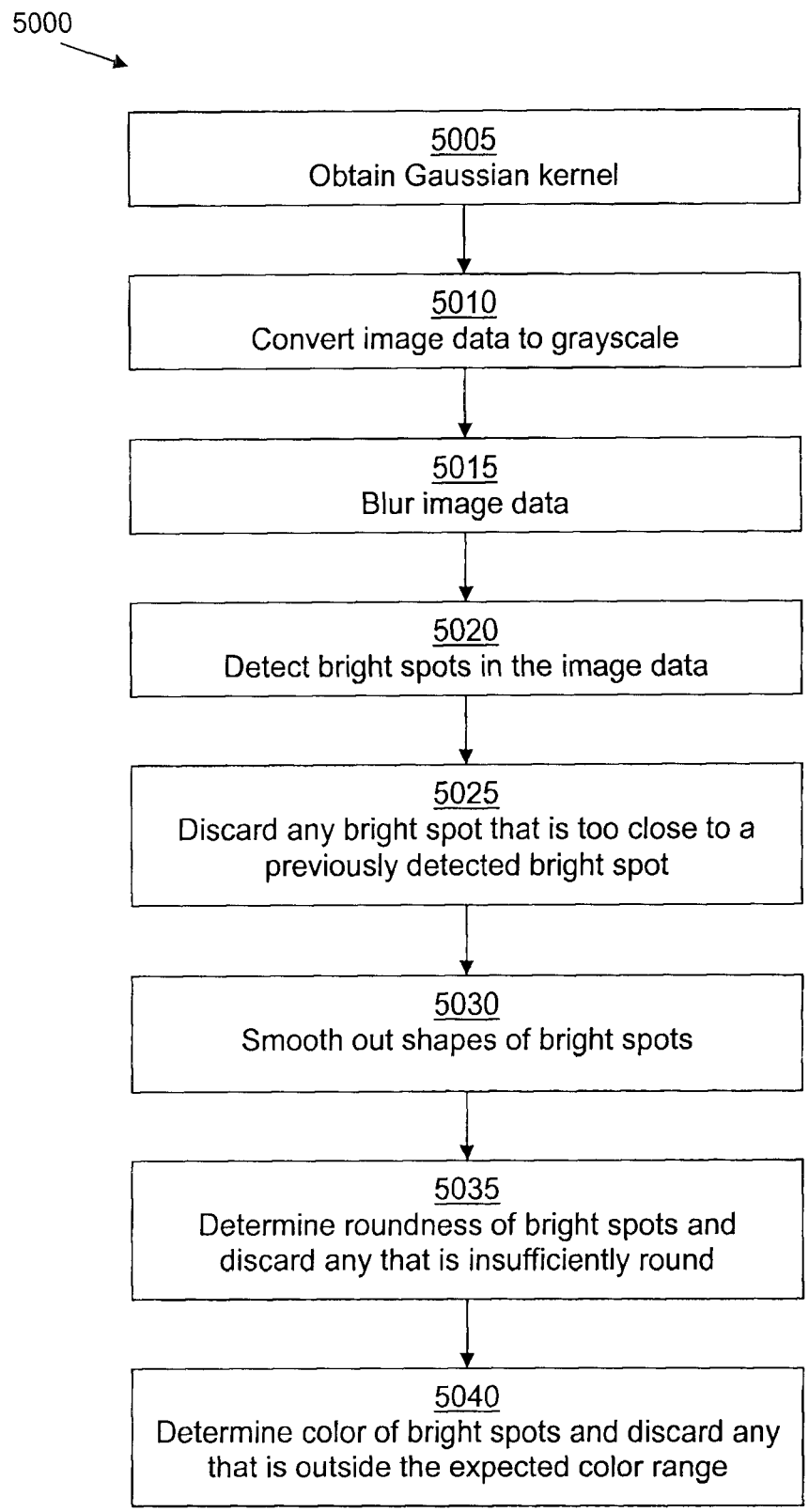
FIG. 21 is a flowchart illustrating an example method of bright spot detection that may be incorporated into the method of FIG. 19.

FIG. 21 shows a flowchart illustrating an example algorithm 5000 for identifying bright spots in a set of image data.

In this example, a difference of Gaussians may be used to identify the bright spots in a single set of image data (e.g., from a single camera 2025 at a single time point).

At 5005, the Gaussian kernel is obtained. This may be done by carrying out the calculations illustrated below. This example Gaussian kernel approximates the Laplacian of Gaussians (LoG) using a value of K=1.6. Sample code below illustrates an example of this step. In this example calculation, 3.0 pixels is predefined as the expected size of a bright spot, spotr (i.e., spot radius). The value of spotr may be selectable by the operator and/or may be predefined and stored in the memory of the processor 2045.

$f(r)=\exp(alpha*r^2)-beta*\exp(gamma*r^2)$ $sigma=spotr*1.75$ $alpha=-1/2*sigma^2$ $beta=1/2.56$ $gamma=-1/5.12sigma^2$ Then, the size of the box (i.e., box width boxw and box radius boxr) used by the kernel is calculated. Sample code for this step is shown below:

$boxw=(floor(sigma*5.0)*2)+1$ $boxw=boxr*2+1$

Finally, the kernel is created and filled. In this example, the kernel may be created by looping through the dimensions of the boxes and providing the resulting value of the formula f(r). Sample code for performing this step is shown below:

```
// allocate and fill kernel
    kern = new double[boxw*boxw];
    for(int i=0; i<boxw; i++)
        for(int j=0; j<boxw; j++) {
            const int index = i+boxw*j;
// integer coordinate on gaussian spot is (i-boxr, j-boxr)
        const double    dx = static_cast<double>(i-boxr),
                        dy = static_cast<double>(j-boxr),
                        r2 = dx*dx+dy*dy,
                        g = exp(alpha*r2) - beta * exp(gamma*r2);
                        kern[index] = g;
        }
``` the minimum distance between bright spots is determined to be spotr*2.

In some examples, the calculations shown above may not be performed, for example where the Gaussian kernel has been pre-calculated, for example during calibration, or is stored in the memory of the processor 2045 as a constant. In such cases, step 5005 may include obtaining the Gaussian kernel by retrieving the kernel value from the memory of the processor 2045, for example.

The image data is then processed to extract the bright spots. In this example, this step may be carried out using a single function to extract the bright spots. This function may perform several tasks on the image data.

At 5010 the function may convert the image data to a grayscale image array. The grayscale used for this conversion may be manually or automatically preset to suit the specific lighting conditions in which the motion capture is used. For example, where the environment has bright lighting, the grayscale may be defined to be more sensitive to brighter lights.

Then, at 5015 the grayscale image may be blurred. In this example, blurring may be carried out by convolving the grayscale image data with the Gaussian kernel calculated previously. Blurring an image using the Gaussian kernel may suppress only high-frequency spatial information, thereby helping to reduce or eliminate unwanted noise or artefacts in the image (e.g., due to dust or vibrations during image capture). The function may convolve the grayscale image data with the Gaussian kernel, as illustrated in the sample code below, using mainRoughres=1 for convolution resolution and kernelRoughres=2 for the kernel's resolution.

```
/////////////////////////////////////////////////////////////////
//// convolve value array with kernel and csache in pixdog
/////////////////////////////////////////////////////////////////
for(int i=boxr+1; i<(width-boxr-1); i+=mainRoughres)
    for(int j=boxr+1; j<(height-boxr-1); j+=mainRoughres) {
        const int pindex = i + width*j;
        pixdog[pindex]=0;
// calculate the product of the image with the kernel at
    this point
        for(int ii=0; ii<boxw; ii+=kernelRoughres)
            // ii, jj are coordinates on the gaussian kernel
            for(int jj=0; jj<boxw; jj+=kernelRoughres) {
                const int index=(i+ii-boxr)+(j+jj-boxr)*width,
                kernelIndex = ii + jj*boxw;
                pixdog[pindex] += pixval[index] * kern[kernelIndex];
            }
    }
```

At 5020, the blurred image data may be processed to identify the brightest spots. The difference of Gaussians score may be used to find the bright spots. The difference of Gaussians is a grayscale image enhancement algorithm that involves the subtraction of the blurred version of the grayscale image data from a less blurred version of the image data. The difference of Gaussians may serve as a band-pass filter that discards all but a handful of spatial frequencies that are present in the grayscale image. As an image enhancement algorithm, the difference of Gaussians may help to increase the detectability of edges and other details present in a digital image. The brightest spots may be determined based on the light intensity (i.e., the value of each grayscale pixel in the grayscale image data) of each spot.

The list of detected bright spots may be stored in the processor 2045 as they are found.

At 5025, as each bright spot is detected, the function determines whether any bright spot is considered to be too close to any other previously detected bright spot. If so, the newly detected bright spot may be discarded on the basis that it is likely a duplicate of the previously detected bright spot.

At 5030, once all the pixels in the image data has been processed and all bright spots have been detected, the image data is processed so that the detected bright spots have a more uniform shape. This may be done by blurring the pixels of the detected bright spot, using a blurring algorithm (e.g., application of a Gaussian kernel). This blurring may be carried out to give detected bright spots a rounder shape than a pixilated misshapen block shape.

At 5035, the roundness of the blurred bright spots is determined, for example using a roundness determination algorithm. Any spots determined to be insufficiently round (e.g., not satisfying a predefined roundness threshold) may be discarded.

At 5040, the color of all remaining bright spots is determined. The color of a bright spot may be determined based on the calculated center pixel of the bright spot. The color of the bright spot may be used to determine whether the bright spot corresponds to a light target 2035 by determining whether the color of the bright spot falls within the expected color range of the light target 2035. In this example, green and blue colors may be identified as corresponding to a LED light target 2035 (e.g., having predefined YUV values corresponding to the green and blue color spectrum). Other colors (e.g., red, yellow and orange) may be identified as being non-target environmental lights and those bright spots may be discarded.

The method 5000 may be repeated for each image data set from each camera 2025 and for each time point. The method 5000 may be carried out for each image data set separately or concurrently. Once the bright spots have been identified and stored by the processor 2045, the method 3000 may continue with image processing camera pairs.

At 3020, the lists of identified bright spots for the cameras are paired up according to the defined camera pairs, to determined matching points. The pairing of the bright spots may be done via a point matching algorithm. The matching of bright spots may be carried out based on the pixel location of the center of a bright spot in each set of image data for each camera 2025 of the camera pair. The matching process may include adjusting for the locations of each camera 2025 and applying a filter range of where the matching spots can exist. A list of potential matching points may be thus generated for the image data for each camera pair.

In some cases, a bright spot in one image data set may not find a match in the other image data set (e.g., where one camera 2025 has an uninterrupted line-of-sight to more light targets 2035 than the other camera 2025 of the camera pair). In such cases, the unmatched bright spot may be discarded for that camera pair. The use of more than two cameras 2025 may provide redundancy in that even if a matching point cannot be found for a given light target 2035 for one camera pair, that light target 2035 may still be matched for another camera pair, thereby avoiding losing the light target 2035 during motion capture.

At 3025, once the matching points have been determined, the centers of the matched points are determined and a three dimensional point is calculated from the pairing of the matched points, using a stereo point creation algorithm, based on triangulation of the two matched points. For this stereo conversion, the processor 2045 may take the matched points and use the predetermined camera calibration constants, as described above, to calculate the x, y and z coordinates for a 3D point. This may be calculated using the tangent angles of the 2D matched points, to determine the distance and angle between the two matched points. Then this calculated data for the 2D points may be used to calculate the 3D point.

Sample code for such an algorithm is provided below, although any other calculation may be used.

```
double tanGamma;
            tanGamma = (calLeft.py + calRight.py)/2.0;
const double  distance = rightPos-leftPos,
            tanAlpha = calLeft.px,
            tanBeta = calRight.px,
            z = distance/(tanAlpha-tanBeta),
            x = z * tanAlpha,
            y = tanGamma * z;
return Vec3d(x + leftPos, y, z, calLeft, calRight);
```

At 3030, the calculated 3D points may be used in a triangle fit algorithm to determine the 3D points that correspond to the known geometry (e.g., determined during calibration or otherwise predefined) of the light targets 2035 of a given mounting fixture 2040. To carry out a fit of the known geometry, the processor may generate combinations of a predefined number of points. The predefined number may correspond to the number of light targets 2035 being used on each mounting fixture 2040. The triangle fit algorithm in this example uses sets of three different points (in the case where each mounting fixture 2040 is mounted with three light targets 2035 each) of the calculated 3D points and determines the distances between the 3D points. The algorithm may be iterated through all possible combinations of the 3D points, keeping track of the thus-far best fit to the known geometry.

The distances between the 3D points are calculated and the list of distances is sorted from largest to smallest. For example, for a grouping of three points, this calculation will result in three calculated distances, sorted smallest to largest; while for a grouping of four points, this calculation will result in eight calculated distances, sorted smallest to largest. The variation of the calculated distances from the known geometry of the light targets 2035 (e.g., based on their known configuration on the mounting fixtures 2040) is calculated.

The distances that are below a preset threshold variance (e.g., preset by the operator or otherwise predefined, such as during calibration) is determined to be a good fit and kept. Those having a higher variance are discarded.

Any fit that is deemed good may be used to calculate the vector direction of the drill or boom 2015, by calculating the vector direction of the triangle fit. The calculated vector direction may be then projected onto the boom 2015. This projected direction may be used to provide feedback to the operator, at 3035 below. The fits are then ranked, smallest variance fit to largest, as the best to worst fits under the variance threshold.

Once a fit is found to be under the variance threshold for a given light target configuration (i.e., for a given set of light targets 2035 on a given mounting fixture 2040), those points for which the fit has been calculated is flagged as "fitted", such that those points will not be considered for fittings for other mounting fixtures 2040. The light targets 2035 for that given mounting fixture 2040 are determined to be "found" and the fitting process is ended for that given mounting fixture 2040. If no fit is found for a given mounting fixture 2040 using one camera pairing, the fitting process is repeated using another camera pairing.

This step may be repeated until an acceptable fit is found or all camera pairs have been considered. The processor may attempt the fitting process starting from a most trusted or most preferred camera pair and proceed through all camera pairs in decreasing order of trust or preference.

Step 3030 may be repeated for all mounting fixtures 2040. The order in which the mounting fixtures 2040 are fitted may be predefined, for example in order of importance.

At 3035, the determined positions for the light targets 2035 and mounting fixtures 2040 are used to calculate the position, orientation and/or direction of each boom 2015. This information may be provided as feedback on the display 2050.

Although the above examples describe the use of the disclosed systems and methods for motion capture of drill booms, other applications in an underground mining or other environments may be possible. For example, the disclosed systems and methods may be used for: orientating and setting up of production drills to help improve accuracy and consistency of target achievement of the planned drill layout; tracking haulage trucks and/or loaders (also known as scoops and scoop trams), and/or their components (e.g., dump boxes, load and dump buckets), during transit and/or operation; tracking position and movement of components such as chutes, skips and/or load and dump pockets in the shaft process; tracking of robotic machinery to provide positional data useable by the machinery to move itself to specific locations and/or orientations; tracking the motion of the booms of the jumbo drilling unit for purposes other than drilling accuracy, for example to help ensure the non-conflict of the booms or to help optimize the utilization of the location of the booms for the work being completed (e.g., bolting, shotcreting, screening, or material handling).

Where the cameras used are able to provide a suitable level of accuracy and precision (e.g., in the case of high density cameras), the disclosed systems and methods may be useful as part of a quick setup of underground surveying tools that may be operated by miners rather than trained technicians, for less crucial tasks, such as tunnel surveying. This may help to reduce the need for large surveying crews and their associated costs. Other uses in the underground environment may also be possible, as will be discussed below.

Although an example of the disclosed systems and methods is described above, variations, modifications and further developments are possible. Some possible further developments are described below. These examples are by no means exhaustive.

Although an example fitting algorithm is described above, it should be understood that this is only an example and different algorithms may be used as appropriate. For example, to obtain improved triangle fits, the three internal angles of the fits may be calculated and compared against the known angles for the known light target geometries. Those that fall outside a set of narrow criteria may be discarded.

The fits may be ranked by best fit against each fit criteria (e.g., distance variances, internal angles, etc.), and assigned a quality value, from 1000 as best to 1 as worst. Each triangle fit may be assigned a cumulative quality fit value. The fits may then be ranked by their quality value and the best fit may be determined.

Although the above process has been described as carrying out fitting using image data from a single camera pair, the fitting may also be carried out using image data from more than two sets of image data, for example by using image data from all cameras 2025 together.

In some examples, the fitting may include storing found fits from previous one or more time points. Information from previous time points may be used as a criterion for determining a fit for a current time point. For example, a 3D point that is too far removed from the 3D points at an immediately previous time point may be discarded.

Alternatively or in addition, the known geometry of the boom 2015 at a previous time point and the known available degrees of freedom for the boom 2015 may be used to discard 3D points that are outside of the known possible range of motion of the boom 2015. For example, once the fit has been found for one or more previous time points, a table of possible positions of the booms 2015 at a current or future time point may be calculated, based on the calculated position, orientation, direction and/or speed at the previous time point(s). A probability process may be used to determine the most probable fit at a current time point. This process may also be used to help verify or validate calculations for the current time point, as well as help to estimate the location of any unmatched points.

In some examples, where a bright point is unmatched in a camera pair, the missing match may be extrapolated or calculated from previous data. For example, data about previous matching points from a previous time point (e.g., the previous 10 time points) may be stored and accessible by the processor. The processor may search the previous matching points to identify any matches that correspond to the unmatched point. This extrapolation may take into account the expected movement of the point. For example, the previous matching points may show a trajectory over time and the processor may extrapolate this trajectory to the expected location of the unmatched point at a current time point. This stored data about previous matching points may also be used to verify or validate calculated locations of a matched point.

In some examples, in place of or in addition to light targets mounted on the tracked subject on a mounting fixture, one or more light targets may be directly fixed on the tracked subject, for example at known points of articulation and/or extremities (e.g., at each joint of a multi-jointed drill boom). Alternatively or in addition, points on the tracked subject may be directly tracked. For example, certain points on the tracked subject may be reflective or brightly colored and used in addition to or in place of one or more light targets. This may allow the light targets to be reduced in number or entirely optional.

In some examples, in place of or in addition to tracking bright points, the disclosed systems and methods may also capture and track an outline or skeleton of the tracked subject. The image processing for capturing and tracking an outline may be similar to capturing and tracking light targets 2035. The image processing for capturing and tracking an outline may be based on detection of the known shape of the subject (e.g., a boom 2015) and the expected orientation and/or position of the subject. This may be based on empirical determinations and/or lookup tables, depending on the surrounding environment (e.g., ambient lighting conditions).

In some examples, other algorithms such as fuzzy logic and/or neural nets may be used as decision making processes for the image processing.

In some examples, the disclosed systems and methods may extrapolate the position of the toe based on, in addition to boom position and orientation, the effect of drill rotation, percussion rate, and/or feed pressure. For example, it is generally known that a drill steel tends to be torqued in the direction of rotation by the drill of the drill to rotate the steel, and the resistance of the drill bit against the end of the hole. By altering the combination of feed and rotational pressure, the torque of the steel may be increased or decreased, thereby increasing or decreasing the deviation of the steel in the hole. Such relationships may be empirically determined (e.g., in different geologies, rock hardness, more or less faulting, etc.) and mapped, to extrapolate the expected resulting position of the toe. This may result in a higher degree of accuracy in projecting where the toe of the blasthole will be positioned. As excessive feed or rotation pressure is applied during drilling, the drill steel may flex slightly inside the blasthole and the drill bit may deviate from an otherwise nearly straight blasthole. This effect may be more pronounced on larger diameter blastholes and larger drill units.

In some examples, the disclosed systems and methods may track more than one subject at the same time, while distinguishing the subjects from each other in the same video or still frame. This may be carried out using edge or outline detection, or light targets. The use of edge or outline detection may allow for more accurate detection of booms that cross each other and/or are obscured by each other.

The disclosed systems and methods may be offered as a package to be retrofitted to conventional drilling systems. Although the disclosed systems and methods have been described with reference to each other, in some examples, the systems may be used independently of the methods and vice versa. For example, the disclosed systems may be used with other methods for motion capture and similarly the disclosed methods may be used with other systems for motion capture. The disclosed systems may be used with different versions of the disclosed methods and vice versa.

Although the present disclosure describes examples of the systems and methods for use in an underground mining environment, the disclosed systems and methods may be used in other applications and environments.

For example, the disclosed systems and methods may be suitable for use in other motion capture applications including motion capture to translate human motion into data for the movie or entertainment industry.

The disclosed systems and methods may also be used in less harsh environments, including, for example, controlled lighting environments and controlled laboratory conditions, as well as surface industrial conditions.

For example, in surface mining applications, the disclosed systems and methods may be used for motion capture and tracking of, for example, dragline bucket motion, heavy digging, loading and hauling equipment motion.

In other surface industrial applications, such as in smelting, milling and refining, the disclosed systems and methods may be used to track motion of moving equipment, and components of heavy mobile and stationary equipment. Examples of such equipment may include overhead cranes, personnel that may be moving below and around in overhead cranes, objects suspended below overhead cranes, loaders, haulage trucks, excavators, draglines, and other such equipment that may be moving around below and between the overhead cranes. The disclosed systems and methods may be used for tracking of various equipment and components, and their relative motion with respect to the available space and to each other.

The disclosed systems and methods may also be useful for tracking of robotic machinery in environments, underground or otherwise, that may be dangerous or inaccessible to human operators.

The disclosed systems and methods may be installed in various industrial environments including, for example, smelters, mills, concentrators, refineries, and surface transportation systems between these plants.

The disclosed systems and methods may be used in both stationary and mobile platforms, for example on land or water, including dredges, barges and floating pipelines, among others.

The embodiments of the present disclosure described above are intended to be examples only. Alterations, modifications and variations to the disclosure may be made without departing from the intended scope of the present disclosure. In particular, selected features from one or more of the above-described embodiments may be combined to create alternative embodiments not explicitly described. All values and sub-ranges within disclosed ranges are also disclosed. The subject matter described herein intends to cover and embrace all suitable changes in technology. All references mentioned are hereby incorporated by reference in their entirety.

The invention claimed is:

1. A system for motion capture of a subject comprising:
   at least two light targets mountable in a predetermined geometry on the subject, the light targets having a set of predetermined characteristics;
   at least two cameras each positionable at a reference location for capturing images of the light targets over multiple time points; and
   a processor in communication with the cameras, the processor executing instructions to cause the processor to:
   receive at least one set of image data from each camera;
   determine any spots corresponding to the light targets in the sets of image data received from each camera by blurring the image data to remove background noise and applying a set of criteria based on the predetermined characteristics of the light targets;
   calculate three-dimensional (3D) locations of the light targets using the determined spots;
   fit the calculated 3D locations to the predetermined geometry of the light targets to calculate at least one of a position value and a motion value for the subject; and
   provide the at least one of the position value and the motion value to be displayed as real-time feedback.

2. The system of claim 1 further comprising a display for displaying the feedback.

3. The system of claim 1 wherein the subject is a piece of equipment to be operated in a surface or underground mining environment.

4. The system of claim 1 wherein the subject is a piece of equipment to be operated in an underground environment.

5. The system of claim 1 wherein the subject is a mobile or stationary piece of machinery.

6. The system of claim 5 wherein the subject is a drill machine to be operated in an underground mining environment.

7. The system of claim 6 wherein the light targets are mounted on at least one boom of the drill machine.

8. The system of claim 1 wherein the light targets are low power light sources.

9. The system of claim 1 wherein the light targets are light reflectors.

10. The system of claim 1 wherein the light targets are mountable on the subject using one or more mounting fixtures.

11. The system of claim 10 wherein two or more light targets are mountable in the predetermined geometry on each mounting fixture.

12. The system of claim 1 wherein the predetermined characteristics of the light targets include one or more of: predetermined light intensity, predetermined light color, predetermined size and predetermined shape.

13. The system of claim 1 wherein the cameras are low power, low resolution cameras.

14. The system of claim 1 wherein there are three cameras that are fixed relative to each other.

15. A method for motion capture of a subject, the method comprising:
   receiving, at a processor, at least one set of image data from at least two cameras, the cameras being positioned at reference locations to capture image data of at least two light targets;
   determining any spots corresponding to the light targets in the sets of image data received from each camera by blurring the image data to remove background noise and applying a set of criteria based on predetermined characteristics of the light targets;

matching the determined spots among two or more sets of image data from different cameras to obtain matched points;

calculating three-dimensional (3D) locations of the light targets using the matched points;

fitting the calculated 3D locations to a predetermined geometry of the light targets to calculate at least one of a position value and a motion value for the subject; and providing the at least one of the position value and the motion value to be displayed as feedback.

16. The method of claim 15 wherein determining the spots corresponding to the light targets comprises:

determining one or more candidate spots by applying a feature detection algorithm to the image data;

storing the one or more candidate spots in a list of candidate spots; and storing the list of candidate spots as a list of spots corresponding to the light targets.

17. The method of claim 16 wherein the feature detection algorithm is a difference of Gaussians algorithm.

18. The method of claim 16 wherein determining the spots corresponding to the light targets further comprises at least one of:

a) determining a light intensity value for the one or more candidate spots and discarding from the list of candidate spots any candidate spots having light intensity values that do not satisfy a predefined light intensity criterion, the light intensity criterion being based on the predetermined characteristics of the light targets;

b) determining a roundness value for the one or more candidate spots and discarding from the list of candidate spots any candidate spots having roundness values that do not satisfy a predefined roundness criterion, the roundness criterion being based on the predetermined characteristics of the light targets; and c) determining a color value for the one or more candidate spots and discarding from the list of candidate spots any candidate spots having color values that do not satisfy a predefined color criterion, the color criterion being based on the predetermined characteristics of the light targets.

19. The method of claim 16 further comprising:

as each new candidate spot is identified, calculating the distance between the new candidate spot and any previously identified candidate spots and discarding the new candidate spot if the distance is below a predefined nearness threshold value.

20. The method of claim 15 wherein blurring the image data comprises convolving the image data with a Gaussian kernel.

21. The method of claim 15 wherein camera pairs are defined among the cameras, each camera taking part in at least one camera pair and the camera pairs being definable to have an overlap in cameras, wherein matching the determined spots comprises:

attempting to match the determined spots between the sets of image data from the cameras of a first camera pair; and for any determined spots that remain unmatched, attempting to match the remaining unmatched determined spots between the sets of image data from the cameras of a second camera pair.

22. The method of claim 15 wherein the predetermined geometry comprises a predetermined number of light targets, wherein fitting the calculated 3D locations to the predetermined geometry comprises:

determining possible combinations of the 3D locations corresponding to the predetermined number of light targets;

for each possible combination, determining a similarity to the predetermined geometry; and determining a most similar combination as a fit to the predetermined geometry.

23. The method of claim 22 wherein determining the similarity to the predetermined geometry comprises calculating a variance of the possible combination from the predetermined geometry.

24. The method of claim 15 wherein the position value is at least one of: a Cartesian position and an orientation.

25. The method of claim 15 wherein the motion value is at least one of: a velocity, an angular velocity and an acceleration.

26. A computer program product for motion capture of a subject, the computer program product comprising computer-executable code that, upon execution, causes a processor to carry out the method of claim 15.

27. A use of the system of claim 1 for motion capture of a subject in an underground environment.

* * * * *